(12) United States Patent
Nammoto et al.

(10) Patent No.: US 9,656,388 B2
(45) Date of Patent: May 23, 2017

(54) ROBOT, ROBOT SYSTEM, CONTROL DEVICE, AND CONTROL METHOD

(71) Applicants: Seiko Epson Corporation, Tokyo (JP); Tohoku University, Aoba-ku, Sendai-shi, Miyagi-ken (JP)

(72) Inventors: Takashi Nammoto, Azumino (JP); Kazuhiro Kosuge, Sendai (JP); Koichi Hashimoto, Sendai (JP)

(73) Assignees: Seiko Epson Corporation (JP); Tohoku University (JP)

( * ) Notice: Subject to any disclaimer, the term of this patent is extended or adjusted under 35 U.S.C. 154(b) by 0 days.

(21) Appl. No.: 14/636,542

(22) Filed: Mar. 3, 2015

(65) Prior Publication Data

US 2015/0251314 A1    Sep. 10, 2015

(30) Foreign Application Priority Data

Mar. 7, 2014    (JP) ................................ 2014-045752

(51) Int. Cl.
*G05B 19/00*    (2006.01)
*B25J 9/16*    (2006.01)

(52) U.S. Cl.
CPC ........... *B25J 9/1612* (2013.01); *B25J 9/1687* (2013.01); *B25J 9/1697* (2013.01); *G05B 2219/39346* (2013.01); *G05B 2219/39394* (2013.01); *G05B 2219/39483* (2013.01); *G05B 2219/39487* (2013.01); *G05B 2219/39543* (2013.01); *G05B 2219/40583* (2013.01)

(58) Field of Classification Search
CPC combination set(s) only.
See application file for complete search history.

(56) References Cited

U.S. PATENT DOCUMENTS

| 4,146,924 | A | * | 3/1979 | Birk | B25J 9/1692 |
| | | | | | 318/568.13 |
| 4,731,856 | A | * | 3/1988 | Lloyd | B23P 19/10 |
| | | | | | 348/94 |
| 4,869,813 | A | * | 9/1989 | Bailey | B07C 5/3422 |
| | | | | | 209/538 |
| 5,308,221 | A | * | 5/1994 | Shimokoshi | B25J 9/1612 |
| | | | | | 414/730 |
| 5,761,390 | A | * | 6/1998 | Koshishiba | G05B 19/402 |
| | | | | | 700/250 |

(Continued)

FOREIGN PATENT DOCUMENTS

JP    2013-180380 A    9/2013

OTHER PUBLICATIONS

T. Nammoto et al., "Model-Based Compliant Motion Control Scheme for Assembly Tasks Using Vision and Force Information", 2013 IEEE International Conference on Automation Science and Engineering, pp. 948-953.

(Continued)

*Primary Examiner* — Jonathan L Sample
(74) *Attorney, Agent, or Firm* — Harness, Dickey & Pierce, P.L.C.

(57) ABSTRACT

Provided is a robot including a hand and a control unit that operates the hand. The control unit rotates a first object around a predetermined position of the first object with the hand and moves the first object with respect to a second object, based on a captured image including the hand and the first object.

12 Claims, 7 Drawing Sheets

(56) References Cited

U.S. PATENT DOCUMENTS

| | | | | |
|---|---|---|---|---|
| 6,681,151 B1* | 1/2004 | Weinzimmer | ......... | B25J 9/1697 |
| | | | | 219/121.85 |
| 7,084,900 B1* | 8/2006 | Watanabe | ............ | G06K 9/6203 |
| | | | | 348/94 |
| 7,177,459 B1* | 2/2007 | Watanabe | .............. | B25J 9/1697 |
| | | | | 382/151 |
| 8,942,845 B2* | 1/2015 | Yamaguchi | .......... | B25J 15/0206 |
| | | | | 700/245 |
| 9,149,928 B2* | 10/2015 | Yamaguchi | .............. | B25J 9/043 |
| 9,352,463 B2* | 5/2016 | Tomo | .................... | B25J 15/0616 |
| 2005/0126833 A1* | 6/2005 | Takenaka | ............... | B25J 13/088 |
| | | | | 180/8.1 |
| 2006/0104788 A1* | 5/2006 | Ban | ........................ | B25J 9/1697 |
| | | | | 414/729 |
| 2006/0241814 A1* | 10/2006 | Jung | .................... | G05D 1/0225 |
| | | | | 700/259 |
| 2007/0276539 A1* | 11/2007 | Habibi | ................... | B25J 9/1612 |
| | | | | 700/245 |
| 2008/0181485 A1* | 7/2008 | Beis | ....................... | B25J 9/1697 |
| | | | | 382/153 |
| 2008/0249659 A1* | 10/2008 | Ueyama | ................. | B25J 9/0018 |
| | | | | 700/245 |
| 2008/0252248 A1* | 10/2008 | Lundberg | ............... | B25J 9/1692 |
| | | | | 318/572 |
| 2008/0267450 A1* | 10/2008 | Sugimoto | ............ | A63H 17/395 |
| | | | | 382/103 |
| 2009/0096790 A1* | 4/2009 | Wiedemann | ....... | G06K 9/00201 |
| | | | | 345/427 |
| 2010/0087955 A1* | 4/2010 | Tsusaka | ................. | B25J 9/0003 |
| | | | | 700/245 |
| 2011/0010009 A1* | 1/2011 | Saito | ..................... | B25J 9/1612 |
| | | | | 700/253 |
| 2012/0048027 A1* | 3/2012 | Hashiguchi | ............ | B25J 9/0087 |
| | | | | 73/763 |
| 2013/0030570 A1* | 1/2013 | Shimizu | ................. | B25J 9/1679 |
| | | | | 700/259 |
| 2013/0197696 A1* | 8/2013 | Nammoto | .............. | B25J 9/1612 |
| | | | | 700/259 |
| 2013/0238128 A1* | 9/2013 | Suzuki | ................... | B25J 9/1669 |
| | | | | 700/258 |
| 2013/0271577 A1* | 10/2013 | Watanabe | ............. | G06T 7/0046 |
| | | | | 348/46 |
| 2014/0074288 A1* | 3/2014 | Satou | ..................... | B25J 9/1679 |
| | | | | 700/253 |

OTHER PUBLICATIONS

K. Kosuge et al., "Planar Parts-Mating Using Structured Compliance", Proceedings of the 2001 IEEE/RSJ, International Conference on Intelligent Robots and Systems, 2001, pp. 1477-1482.

T. Nammoto et al., "Model-Based Compliant Motion Control Scheme for Assembly Tasks Using Vision and Force Information", 2013 IEEE International Conference on Automation Science and Engineering, pp. 960-965.

* cited by examiner

ROBOT, ROBOT SYSTEM, CONTROL DEVICE, AND CONTROL METHOD

CROSS-REFERENCE TO RELATED APPLICATIONS

Priority is claimed on Japanese Patent Application No. 2014-045752, filed Mar. 7, 2014, the content of which is incorporated herein by reference.

BACKGROUND OF THE INVENTION

Field of the Invention

The present invention relates to a robot, a robot system, a control device, and a control method.

Description of the Related Art

A technology for performing compliant motion control of a robot based on information acquired by a force sensor, which is information on a force acting on a gripping unit of the robot or a manipulation target gripped by the gripping unit, and a captured image imaged by an imaging unit has been researched and developed.

In connection with this, for example, a control device that controls a robot to maintain a motion characteristic set for each axis of compliant motion control in an initial state and perform good assembly work even when a posture for an manipulation target is changed during the work, by sequentially acquiring directions of coordinate axes of the compliant motion control defined for the manipulation target from a captured image when the robot is caused to perform assembly work of assembling the manipulation target and an assembly target into a predetermined state has been known. Also, in such a control device, a method of controlling the robot to perform good assembly work by setting a rotation center when the manipulation target rotates to a predetermined position of the manipulation target depending on a rotation moment applied to the manipulation target has been known (see Proceedings of the 2001 IEEE/RSJ International Conference on Intelligent Robots and Systems, pp. 1477-1482, 2001).

However, in the method of the related art, when a position of the rotation center is changed with a relative position between the gripping unit and the manipulation target as the manipulation target comes in contact with the assembly target during work, the change in the position of the rotation center cannot be detected and good assembly work may not be performed.

SUMMARY OF THE INVENTION

Therefore, the present invention has been made in view of the problems of the method in the related art, and provides a robot, a robot system, a control device, and a control method capable of performing good assembly work.

According to a first aspect of the present invention, a robot includes: a hand; and a control unit that operates the hand, wherein the control unit rotates a first object around a predetermined position of the first object and relatively moves the first object with respect to a second object with the hand, based on a captured image including the hand and the first object.

Through this configuration, the robot rotates the first object around a predetermined position of the first object and relatively moves the first object with respect to a second object with the hand, based on the captured image including the hand and the first object. Therefore, the robot can perform good assembly work.

According to a second aspect of the present invention, the predetermined position may be a coordinate origin that moves with the first object, and the control unit may translate the first object in addition to rotating the first object.

Through this configuration, the robot uses a rotation center in the case of rotation as the coordinate origin moving with the first object, and relatively moves the first object with respect to the second object through rotation and translation. Therefore, the robot can perform good assembly work.

According to a third aspect of the present invention, the control unit may perform visual servo control based on the captured image.

Through this configuration, the robot performs visual servo control based on the captured image. Therefore, the robot can relatively move the first object with respect to the second object, and as a result, can perform good assembly work with high precision.

According to a fourth aspect of the present invention, the control unit may perform compliant motion control according to a motion characteristic set in the predetermined position and each axial direction.

Through this configuration, the robot performs compliant motion control according to the motion characteristic set in the predetermined position and each axial direction. Therefore, the robot can assemble the first object with respect to the second object without damaging the second object.

According to a fifth aspect of the present invention, the control unit may derive a relative positional relationship between a position set in the hand and a position set in the first object based on the captured image, and update the predetermined position based on the derived positional relationship.

Through this configuration, the robot derives the relative positional relationship between the position set in the hand and the position set in the first object based on the captured image, and updates the predetermined position based on the derived positional relationship. Therefore, even when the positional relationship between the hand and the predetermined position is shifted due to an external force, the robot can relatively move the first object with respect to the second object around the shifted predetermined position and, as a result, can perform good assembly work.

According to a sixth aspect of the present invention, the control unit may update the predetermined position based on the derived positional relationship, and a relative positional relationship between the position set in the first object and the predetermined position.

Through this configuration, the robot derives the relative positional relationship between the position set in the hand and the position set in the first object, and updates the predetermined position based on the derived positional relationship, and the relative positional relationship between the position set in the first object and the predetermined position. Therefore, even when the positional relationship between the hand and the predetermined position is shifted due to an external force, the robot can indirectly recognize the shifted predetermined position from the relative positional relationship between the position set in the hand and the predetermined position through the position set in the first object and, as a result, can relatively move the first object with respect to the second object around the shifted predetermined position.

According to a seventh aspect of the present invention, the robot may include a marker indicating a position of a force sensor that detects an external force acting on a hand, the captured image may further include the marker, a position set in the hand may be represented by a position of the force sensor in the robot, and the control unit may derive a relative positional relationship between a position set in the hand and the predetermined position based on the position of the marker detected from the captured image, and update the predetermined position based on the derived relative positional relationship between the position set in the hand and the predetermined position.

Through this configuration, the robot derives a relative positional relationship between the position set in the hand and the predetermined position based on the position of the marker indicating the position of the force sensor detected from the captured image, and updates the predetermined position based on the derived relative positional relationship between the position set in the hand and the predetermined position. Therefore, even when the force sensor is covered with a member of an arm unit of the robot, the robot can recognize the position of the first object using the position of the marker indicating the force sensor as a mark and, as a result, can perform good assembly work.

According to an eighth aspect of the present invention, the robot may include a force sensor that detects an external force acting on the hand, a position set in the hand may be represented by a position of the force sensor, and the control unit may derive a relative positional relationship between the position set in the hand and the predetermined position based on a position and a posture in an initial state of the force sensor, and updates the predetermined position based on the derived relative positional relationship between the position set in the hand and the predetermined position may be used.

Through this configuration, the robot derives the relative positional relationship between the position set in the hand and the predetermined position based on the position and the posture in an initial state of the force sensor, and updates the predetermined position based on the derived relative positional relationship between the position set in the hand and the predetermined position. Therefore, even when an arm unit of the robot including the force sensor is shifted from an angle of view of the imaging unit, the robot can recognize the position of the first object and, as a result, can perform good assembly work.

According to a ninth aspect of the present invention, a robot system includes: a robot including a hand; and an imaging unit that images the hand and a first object, wherein the robot rotates the first object around a predetermined position of the first object and relatively moves the first object with respect to a second object based on a captured image including the hand and the first object captured by the imaging unit.

Through this configuration, the robot system rotates the first object around the predetermined position of the first object and relatively moves the first object with respect to the second object based on the captured image including the hand and the first object. Therefore, the robot system can perform good assembly work using the robot.

According to a tenth aspect of the present invention, a control device for operating a robot includes a hand, wherein the control device causes the robot to rotate a first object around a predetermined position of the first object and relatively move the first object with respect to a second object, based on a captured image including the hand and the first object.

Through this configuration, the control device causes the robot to rotate a first object around the predetermined position of the first object and relatively move the first object with respect to the second object, based on the captured image including the hand and the first object. Therefore, the control device can perform good assembly work using the robot.

According to an eleventh aspect of the present invention, a control method for operating a robot including a hand, includes: acquiring a captured image including the hand and a first object; and rotating the first object around a predetermined position of the first object and relatively moving the first object with respect to a second object based on the captured image.

Through this configuration, the method includes rotating the first object around the predetermined position of the first object and relatively moving the first object with respect to a second object based on the captured image. Therefore, the control method can perform good assembly work.

Thus, the robot, the robot system, the control device, and the control method rotates the first object around the predetermined position of the first object and relatively moves the first object with respect to the second object with the hand, based on the captured image including the hand and the first object. Therefore, the robot, the robot system, the control device and the control method can perform good assembly work.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE PREFERRED EMBODIMENTS

First Embodiment

Figure 1:
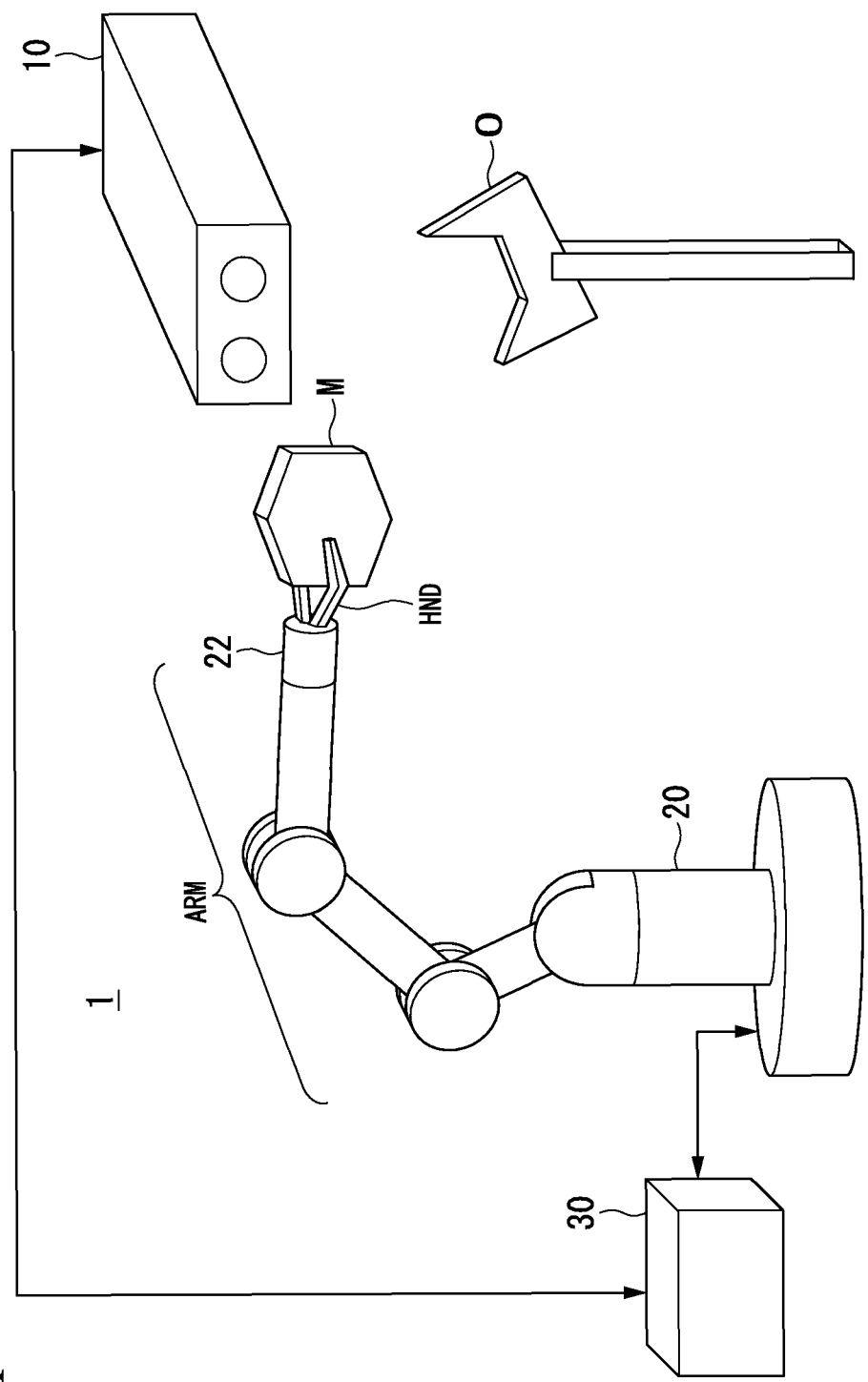
FIG. 1 is a configuration diagram illustrating an example of the robot system 1 according to a first embodiment.

Hereinafter, a first embodiment of the present invention will be described with reference to the drawings. FIG. 1 is a configuration diagram illustrating an example of a robot system 1 according to the first embodiment. The robot system 1 includes an imaging unit 10, a robot 20, and a control device 30.

The imaging unit 10 is, for example, a camera including a CCD (Charge Coupled Device) or a CMOS (Complementary Metal Oxide Semiconductor) which is an imaging element that converts condensed light into an electrical signal. Further, the imaging unit 10 is a stereo camera including two cameras, but may include, for example, three or more cameras or may have a configuration in which a two-dimensional image is captured by one camera.

The imaging unit 10 is connected to the control device 30 via a cable so that the imaging unit 10 can communicate with the control device 30. For example, wired communication via the cable is performed according to a standard such as Ethernet (registered trademark), a USB (Universal Serial Bus), or the like. Further, the imaging unit 10 and the control device 30 may be connected through wireless communication performed according to a communication standard such as Wi-Fi (registered trademark).

The imaging unit 10 is installed in a position in which a range including the robot 20, a manipulation target M gripped by a gripping unit HND of the robot 20, and an assembly target O into which the manipulation target M is assembled by the robot 20 can be imaged. The manipulation target M is, for example, a member assembled into the assembly target O in a predetermined state and forming one industrial product. Further, in the following description, the manipulation target M is assumed to have been gripped by the gripping unit HND of the robot 20 in advance.

The assembly target O is installed in a position apart from the robot 20 by a jig or the like in advance in a range in which the manipulation target M can be assembled using the robot 20, as illustrated in FIG. 1.

For example, the robot 20 is a single arm robot including the gripping unit HND (an end effector), a force sensor 22, an arm unit ARM (a manipulator), and a plurality of actuators, which are not illustrated. Further, the robot system 1 may have a configuration in which a dual-arm robot is included, in place of a configuration in which a single arm robot is included. An embodiment of the configuration in which the robot system 1 includes a dual-arm robot will be described in the second embodiment.

The arm of the robot 20 is a 6-axis vertical multi-joint type, and can perform an operation at a degree of freedom of six axes through an operation in which a support stand, the arm unit ARM, and the gripping unit HND cooperate using the actuators. Further, the arm of the robot 20 may operate at 5 degrees of freedom (5 axes) or less, and may operate at 7 degrees of freedom (7 axes) or more. Hereinafter, an operation of the robot 20 performed by the arm including the gripping unit HND and the arm unit ARM will be described. Further, the gripping unit HND is an example of a hand.

The robot 20 is connected to the control device 30, for example, via a cable so that the robot can communicate with the control device 30. For example, wired communication through the cable is performed according to a standard such as Ethernet (registered trademark) or a USB. Further, the robot 20 and the control device 30 may be connected through wireless communication performed according to a communication standard such as Wi-Fi (registered trademark). Further, in the robot system 1, a configuration in which the robot 20 is connected to the control device 30 installed outside the robot 20 as illustrated in FIG. 1 is adopted. However, in place of this configuration, a configuration in which the control device 30 is built in the robot 20 may be adopted.

The gripping unit HND of the robot 20 includes a claw unit which can grip an object.

The force sensor 22 is included between the gripping unit HND and the arm unit ARM of the robot 20 and detects a force or a moment acting on the gripping unit HND (or the manipulation target M gripped by the gripping unit HND).

The force sensor 22 outputs information indicating the detected force or moment to the control device 30 through communication. For example, the information indicating the force or the moment detected by the force sensor 22 is used for, for example, compliant motion control of the robot 20 by the control device 30.

The robot 20 acquires a control signal based on a relative positional relationship among the manipulation target M, the assembly target O, and the force sensor 22 from the control device 30, and performs predetermined work on the manipulation target M based on the acquired control signal. The predetermined work is, for example, work of moving the manipulation target M gripped by the gripping unit HND of the robot 20 from a current position, and assembling the manipulation target M into the assembly target O.

The control device 30 controls the robot 20 to perform predetermined work. More specifically, the control device 30 derives a relative positional relationship of the manipulation target M, the assembly target O, and the force sensor 22 based on a captured image captured by the imaging unit 10, which is a captured image including an imaged range in which the robot 20, the manipulation target M gripped by the gripping unit HND of the robot 20, and the assembly target O into which the manipulation target M is assembled by the robot 20 are included.

Also, the control device 30 controls the robot 20 to perform predetermined work based on the derived relative positional relationship. That is, the control device 30 controls the robot 20 so that the manipulation target M is assembled into the assembly target O by relatively moving the manipulation target M with respect to the assembly target O using the gripping unit HND and the arm unit ARM.

Further, the control device 30 may control the robot 20 so that the robot 20 rotates the manipulation target M gripped by the gripping unit HND when relatively moving the manipulation target M with respect to the assembly target O. In this case, the control device 30 controls the robot 20 to rotate the manipulation target M around a predetermined position (hereinafter referred to as a rotation center position) set in the manipulation target M. Further, a posture of the manipulation target M in the rotation center position is hereinafter referred to as a rotation center posture.

In this control, even when a relative position and a relative posture of the manipulation target M and the force sensor 22 (a relative positional relationship) vary, the control device 30 detects a rotation center position and a rotation center posture after the relative positional relationship varies from the captured image captured by the imaging unit 10. Based on the detected rotation center position and the detected rotation center posture, the control device 30 always rotates the manipulation target M based on the rotation center posture around the rotation center position set in the manipulation target M. Further, the rotation center position is set to any position on the manipulation target M by a user. Further, while the rotation center posture is a posture of the manipulation target M in the rotation center position, the rotation center posture may not match the posture of the manipulation target M as long as the rotation center posture is associated with the posture of the manipulation target M.

Figure 2:
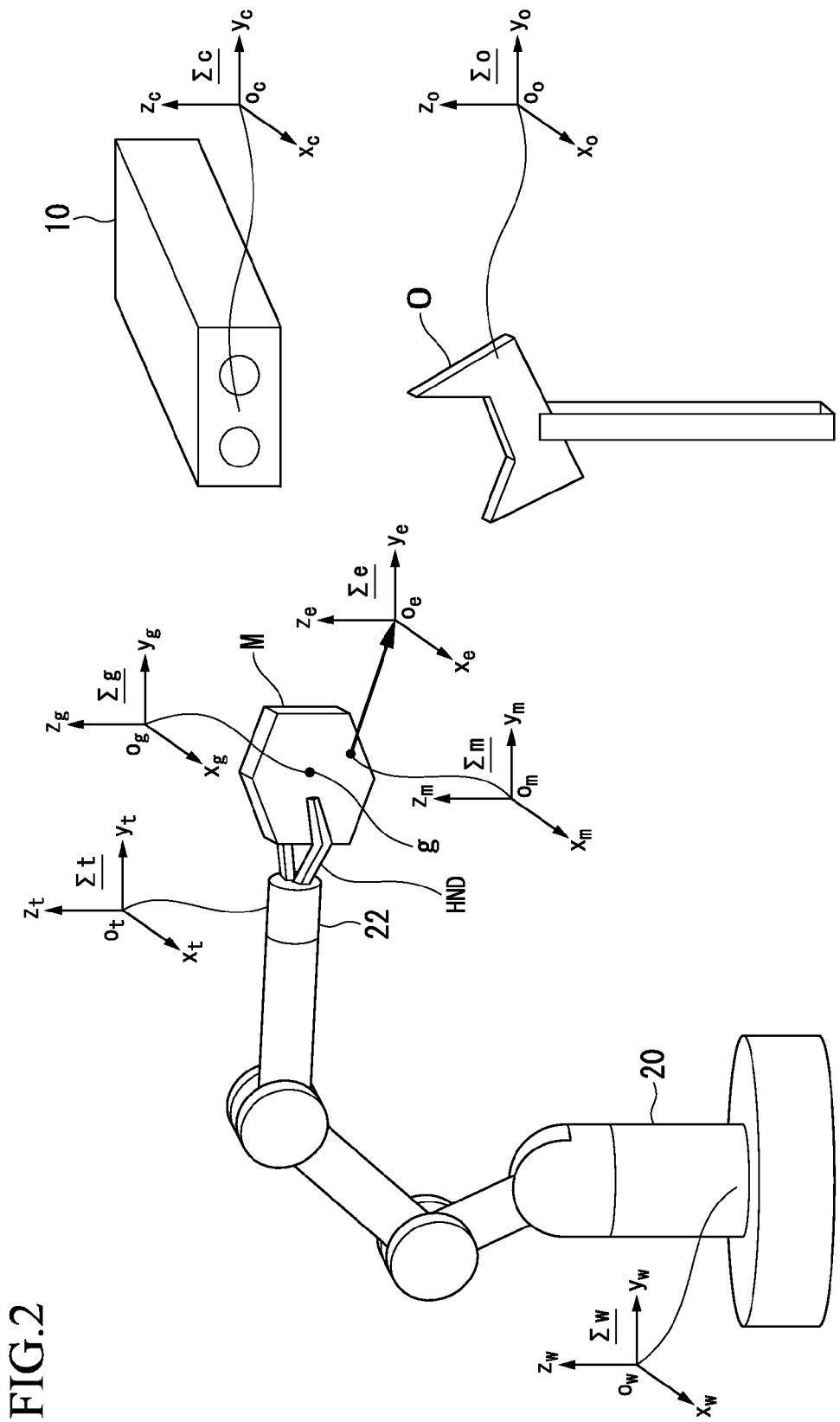
FIG. 2 is a diagram illustrating an example of a coordinate system used in the robot system 1.

Here, coordinate systems used in the robot system 1 will be described with reference to FIG. 2. FIG. 2 is a diagram illustrating coordinate systems used in the robot system 1. Further, a letter after "_" is described to indicate a subscript of a letter before "_" in the following description. The control device 30 of the robot system 1 performs a control process so that the robot 20 performs predetermined work using seven three-dimensional Cartesian coordinate systems, that is, an imaging unit coordinate system Σ_c, a work coordinate system Σ_w, a tool coordinate system Σ_t, a gravity center coordinate system Σ_g, a manipulation target coordinate system Σ_m, an external force coordinate system Σ_e, and an assembly target coordinate system Σ_o, as illustrated in FIG. 2. Origins of these seven coordinate systems and directions of the coordinate axes are set (stored or registered) in the control device 30 by the user.

Each of the origins of the seven coordinate systems is set to move with a target X so as to represent a position of the target X (in this case, the imaging unit 10, a support stand of the robot 20, the force sensor 22, a center of gravity of the manipulation target M, a rotation center of the manipulation target M, the manipulation target M, or the assembly target O). Further, each of the directions of the coordinate axes of the seven coordinate systems is set to move with a change in a posture of the target X so as to represent the posture of the target X. Further, the user may associate the position of the target X with the position of the origin of the coordinate system, and may set the position of the origin of the coordinate system to be set for the target X and the direction of the coordinate axis to an arbitrary position and direction on the assumption that a slope of the target X and the direction of the coordinate system can be associated.

The imaging unit coordinate system Σ_c is a coordinate system representing a position (for example, a position determined in advance on an imaging element is the origin) and a posture of the imaging unit 10.

The work coordinate system Σ_w is a coordinate system representing a position and a posture of the support stand of the robot 20.

The tool coordinate system Σ_t is a coordinate system set in a position (for example, a position of a marker indicating a center of gravity of the force sensor 22 or a position of the force sensor 22 is the origin) or a posture of the force sensor 22. Further, in this embodiment, the tool coordinate system Σ_t represents a position and a posture of the force sensor 22 and a position and a posture of the gripping unit HND so as to simplify description. Generally, a sensor coordinate system representing a position and a posture of the force sensor 22 and a hand (gripping unit) coordinate system representing a position and a posture of the gripping unit HND do not match, and the control device 30 calculates a relative positional relationship between the work coordinate system and the hand coordinate system using the relative positional relationship between the work coordinate system and the sensor coordinate system and the relative positional relationship between the sensor coordinate system and the hand coordinate system, and performs control of the robot 20 based on the calculated relative positional relationship between the work coordinate system and the hand coordinate system.

The gravity center coordinate system Σ_g is a coordinate system representing a position and a posture of the center of gravity of the manipulation target M.

The manipulation target coordinate system Σ_m is a coordinate system representing a position and a posture of the manipulation target M (for example, a position on the manipulation target M most apart from the gripping unit HND in an initial state).

The external force coordinate system Σ_e is a coordinate system that defines an external force and external moment acting on the target. Further, in this disclosure, a coordinate system that defines a motion based on compliant motion control is caused to match the external force coordinate system Σ_e. That is, rotation motion based on compliant motion control is represented by rotation around the origin of the external force coordinate system Σ_e based on the posture of the external force coordinate system Σ_e. However, the systems may be not matched or may be arbitrarily arranged by the user. Further, hereinafter, an external force (that is, an external force detected by the force sensor) acting on the target is simply referred to as a force, and an external moment (that is, a moment detected by the force sensor) is referred to as a moment as long as it is not necessary to distinguish them. As described above, the rotation center position can be set to an arbitrary position by the user, but is assumed to be set to a predetermined position on the manipulation target M in this embodiment.

The assembly target coordinate system Σ_o is a coordinate system representing a position and a posture of the assembly target O (for example, a position on the assembly target O nearest to the manipulation target M).

In the following description, a position of an origin of the coordinate system b in the coordinate system a is assumed to be a position of the target X in which the coordinate system b is set since the coordinate system moves with the target X. For example, the position of the origin of the manipulation target coordinate system Σ_m in the work coordinate system Σ_w is referred to as a position of the manipulation target M in the work coordinate system Σ_w. Similarly, the posture of the coordinate system b in the coordinate system a will be described as a posture of the target X in which the coordinate system b is set. For example, the posture of the manipulation target coordinate system Σ_m in the work coordinate system Σ_w is referred to as a posture of the manipulation target M in the work coordinate system Σ_w.

Here, a notation of equations used to describe a process performed by the control device 30 is shown prior to a more concrete description. First, in the following description, a letter after "^" is described to indicate a superscript of a letter before "^". Further, a first letter with "(→)" is described to be a vector. Further, a first letter with "(^)" is described to be a matrix.

Under this notation, in the coordinate system a, a vector representing the position of the target X in which the coordinate system b is set is represented as a position vector p_b^a(→). The position vector p_b^a(→) is defined by an x coordinate x^b, a y coordinate y^b, and a z-coordinate z^b of the target X in the coordinate system b, as shown in Equation (1) below.

$$\vec{p}_b^a = [x_b^a\ y_b^a\ z_b^a] \tag{1}$$

Similar to the notation of the position vector, a vector representing the posture of the target X in which the coordinate system b is set in the coordinate system a is represented as a posture vector o_b^a(→). The posture vector o_b^a(→) is represented as Equation (2) below using Eulerian angles (α_b^a, β_b^a, and γ_b^a) as components, as shown in Equation (2) below.

$$\vec{o}_b^a = [\alpha_b^a\ \beta_b^a\ \gamma_b^a] \tag{2}$$

Here, the Eulerian angles are defined as angles rotated around a z-axis, a y-axis and an x-axis of the coordinate system a to cause the x-axis, the y-axis and the z-axis of the coordinate system a to match an x-axis, an y-axis and a z-axis of the coordinate system b, and are represented as γ_b^a, β_b^a and α_b^a.

A rotation matrix when the position and the posture of the target X represented by the posture of the coordinate system b are rotated to the position and the posture of the target X represented by the posture of the coordinate system a is represented as a rotation matrix $R\_b\hat{\ }a(\hat{\ })$. Further, there is a relationship between the above-described Eulerian angles and the rotation matrix in Equation (3) shown below.

$$\vec{o}(\hat{R}) = [\operatorname{atan}(R_{33}/-R_{23})\operatorname{asin}(R_{13})\operatorname{atan}(-R_{32}/R_{13})]$$

$$\hat{R}(\vec{o}) = \begin{bmatrix} \cos\beta\cos\gamma & -\cos\beta\sin\gamma & \sin\beta \\ \sin\alpha\sin\beta\cos\gamma + \cos\alpha\sin\gamma & -\sin\alpha\sin\beta\sin\gamma + \cos\alpha\cos\gamma & -\sin\alpha\cos\beta \\ -\cos\alpha\sin\beta\cos\gamma + \sin\alpha\sin\gamma & \cos\alpha\sin\beta\sin\gamma + \sin\alpha\cos\gamma & \cos\alpha\cos\beta \end{bmatrix} \quad (3)$$

Here, for the vectors shown in Equations (1) to (3) described above, a top and a bottom of the subscript can be replaced in conversion equations (4) to (6) below.

$$\vec{o}_a^{\ b} = \vec{o}([\hat{R}(\vec{o}_b^{\ a})]^T) \quad (4)$$

$$\vec{p}_a^{\ b} = [\hat{R}_b^{\ a}]^T(-\vec{p}_b^{\ a}) \quad (5)$$

$$\vec{R}_a^{\ b} = [\hat{R}_b^{\ a}]^T \quad (6)$$

Here, [R_b^a(^)]^T indicates a transposed matrix of R_a^b. That is, a subscript of the rotation matrix can be replaced by transposing the rotation matrix, and a subscript of the vector can be replaced by the rotation matrix. Further, hereinafter, a position vector p_b^a(→) indicating the position of the target X in which the coordinate system b is set in the coordinate system a is simply referred to as a position of the target X in the coordinate system a, except for a case in which there is a need. For example, a position vector p_o^c(→) indicating the position of the origin of the assembly target coordinate system Σ_o set in the assembly target O represented in the imaging unit coordinate system Σ_c is simply referred to as a position of the assembly target O in the imaging unit coordinate system Σ_c.

Similar to the case of the position, hereinafter, a posture vector o_b^a(→) indicating the posture of the target X in which the coordinate system b is set in the coordinate system a is simply referred to as a posture of the target X in the coordinate system a except for a case in which there is a need. For example, a posture vector o_o^c(→) indicating the posture of the assembly target coordinate system Σ_o set in the assembly target O represented in the imaging unit coordinate system Σ_c is simply referred to as a posture of the assembly target O in the imaging unit coordinate system Σ_c.

Figure 3:
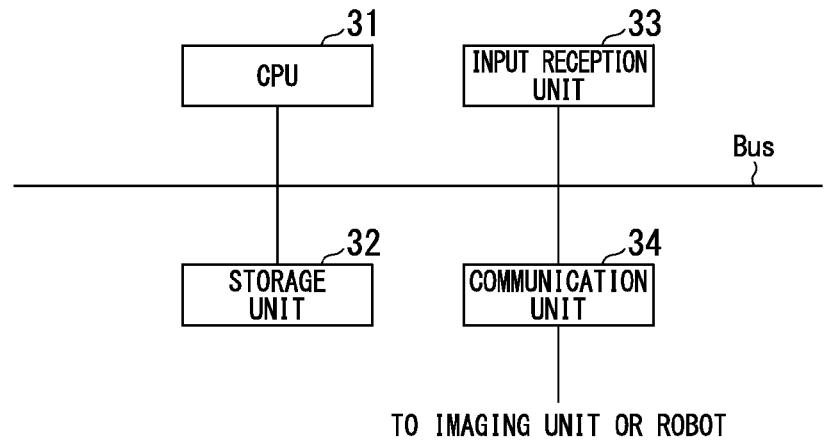
FIG. 3 is a diagram illustrating an example of a hardware configuration of a control device 30.

Next, a hardware configuration of the control device 30 will be described with reference to FIG. 3. FIG. 3 is a diagram illustrating an example of the hardware configuration of the control device 30. The control device 30 includes, for example, a CPU (Central Processing Unit) 31, a storage unit 32, an input reception unit 33, and a communication unit 34, and performs communication with the imaging unit 10, the robot 20 or the like via the communication unit 34. These components are connected via a bus so that the components can communicate with each other. The CPU 31 executes various programs stored in the storage unit 32.

The storage unit 32 includes, for example, an HDD (Hard Disk Drive), an SSD (Solid State Drive), an EEPROM (Electrically Erasable Programmable Read-Only Memory), a ROM (Read-Only Memory), or a RAM (Random Access Memory), and stores various pieces of information, images, and programs processed by the control device 30. Further, the storage unit 32 may be an external storage device connected by, for example, a digital input and output port such as a USB, rather than a storage unit built in the control device 30.

The input reception unit 33 is, for example, a keyboard, a mouse, a touch pad, or another input device. Further, the input reception unit 33 may function as a display unit or may be configured as a touch panel.

The communication unit 34 includes, for example, a digital input and output port such as a USB, or an Ethernet port.

Figure 4:
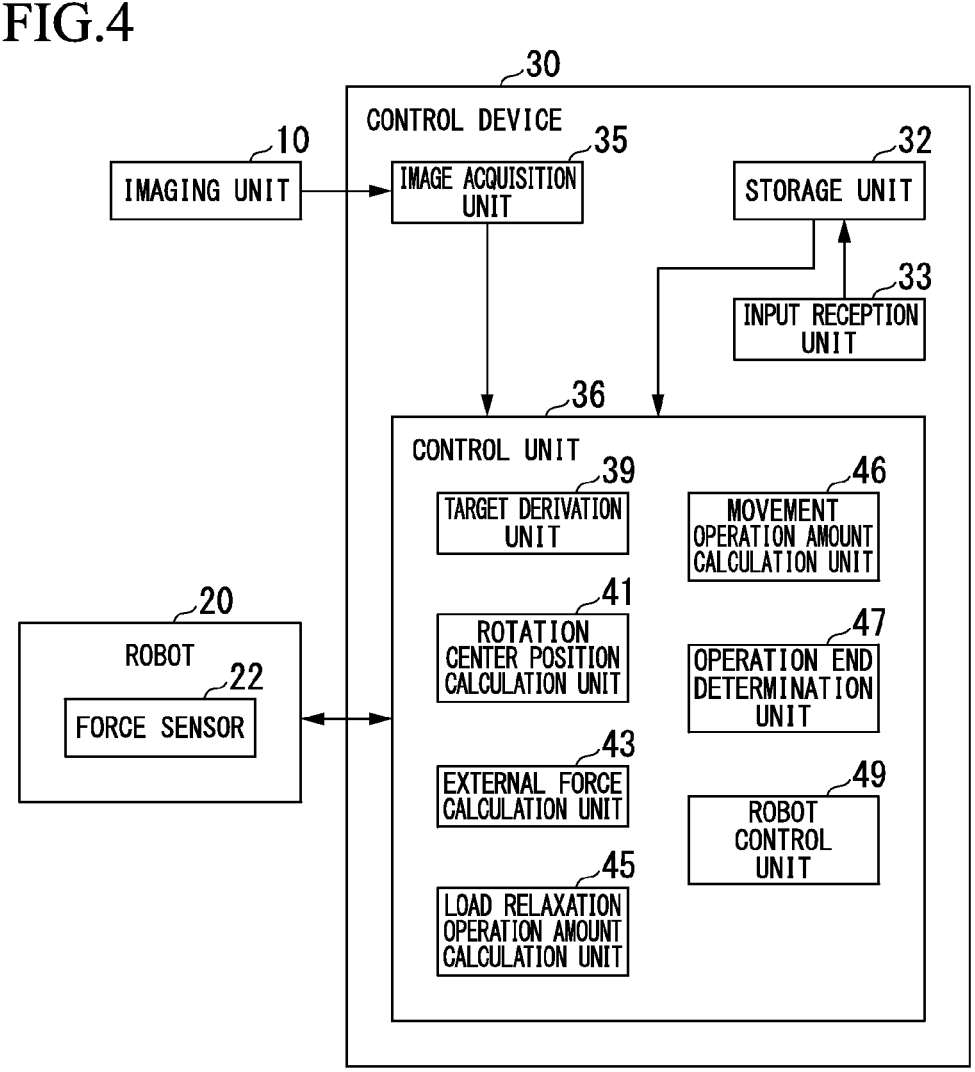
FIG. 4 is a diagram illustrating an example of a functional configuration of the control device 30.

Next, a functional configuration of the control device 30 will be described with reference to FIG. 4. FIG. 4 is a diagram illustrating an example of a functional configuration of the control device 30. The control device 30 includes a storage unit 32, an input reception unit 33, an image acquisition unit 35, and a control unit 36. For example, some or all of these functional units are realized by the CPU 31, which executes various programs stored in the storage unit 32. Further, some or all of these functional units may be hardware functional units such as an LSI (Large Scale Integration) or an ASIC (Application Specific Integrated Circuit).

The control device 30 relatively moves the manipulation target M with respect to the assembly target O so that the manipulation target M and the assembly target O are assembled without damaging the manipulation target M by combining compliant motion control into a loop of visual servo. More specifically, the control device 30 controls the robot 20 so that the manipulation target M changes into the same state as that of a template image (for example, a CAD (Computer Aided Design) image in a state in which the manipulation target M and the assembly target O are assembled) stored in the storage unit 32 in advance using a visual servo technology.

In this case, when the control device 30 detects a relative positional relationship between the manipulation target M and the force sensor 22 in the captured image captured by the imaging unit 10, and sequentially determines the rotation center position and the rotation center posture defining its operation when controlling the robot 20 through compliant motion control based on the detected relative positional relationship. Also, when the control device 30 causes the robot 20 to perform an operation of rotating the manipulation target M, the control device 30 controls the robot 20 to rotate the manipulation target M based on the rotation center posture around the rotation center position. Further, when the control device 30 causes the robot 20 to translate the manipulation target M, the control device 30 controls the robot 20 to translate the manipulation target M based on the rotation center posture.

Further, the control device 30 includes a time measuring unit, which is not illustrated, acquires the captured image captured by the imaging unit 10 from the image acquisition unit 35 at a timing measured by the time measuring unit, and acquires information indicating the force and the moment detected by the force sensor 22 from the force sensor 22 of the robot 20 at the same timing.

The image acquisition unit 35 acquires the captured image captured by the imaging unit 10. The image acquisition unit 35 outputs the acquired captured image to the control unit 36.

The control unit 36 includes a target derivation unit 39, a rotation center position calculation unit 41, an external force calculation unit 43, a load relaxation operation amount calculation unit 45, a movement operation amount calculation unit 46, an operation end determination unit 47, and a robot control unit 49.

The target derivation unit 39 detects a position and a posture of the assembly target O in the imaging unit coordinate system $\Sigma\_c$ from the captured image acquired by the image acquisition unit 35.

Further, the target derivation unit 39 derives a position and a posture of the manipulation target M in the imaging unit coordinate system $\Sigma\_c$ after assembly completion, based on the position and the posture of the assembly target O in the imaging unit coordinate system $\Sigma\_c$. When performing this derivation, the target derivation unit 39 detects the position and the posture of the manipulation target M after the assembly completion based on the above-described template image. Hereinafter, the position and the posture of the manipulation target M in the imaging unit coordinate system $\Sigma\_c$ after the assembly completion derived by the target derivation unit 39 are referred to as a target position and a target posture.

The rotation center position calculation unit 41 detects a current position and current posture of the manipulation target M in the imaging unit coordinate system $\Sigma\_c$ from the captured image acquired by the image acquisition unit 35. Further, the rotation center position calculation unit 41 detects the position and the posture of the imaging unit 10 in the tool coordinate system $\Sigma\_t$. Further, the rotation center position calculation unit 41 calculates a rotation center position and a rotation center posture in the tool coordinate system $\Sigma\_t$ based on the detected current position and posture of the manipulation target M in the imaging unit coordinate system $\Sigma\_c$, the detected position and posture of the imaging unit 10 in the tool coordinate system $\Sigma\_t$, and the rotation center position and the rotation center posture in the manipulation target coordinate system $\Sigma\_m$ set in advance by the user.

Further, the rotation center position calculation unit 41 calculates a position and a posture of the force sensor 22 in the work coordinate system $\Sigma\_w$ using forward kinematics. Further, the rotation center position calculation unit 41 calculates a position and a posture of the support stand of the robot 20 in the external force coordinate system $\Sigma\_e$ based on the calculated rotation center position and rotation center posture in the tool coordinate system $\Sigma\_t$, and the position and the posture of the force sensor 22 in the work coordinate system $\Sigma\_w$.

The external force calculation unit 43 calculates the force and the moment acting on the gripping unit HND acquired from the force sensor 22, which are a force and moment represented in the tool coordinate system $\Sigma\_t$, as a force and moment in the external force coordinate system $\Sigma\_e$, based on the position and the posture of the support stand of the robot 20 in the external force coordinate system $\Sigma\_e$ calculated by the rotation center position calculation unit 41.

The load relaxation operation amount calculation unit 45 calculates a relaxation operation amount for moving the manipulation target M, which is a relaxation operation amount in the external force coordinate system $\Sigma\_e$ to relax the force acting on the manipulation target M gripped by the gripping unit HND of the robot 20, based on the force and the moment calculated by the external force calculation unit 43, which are a force and moment represented in the external force coordinate system $\Sigma\_e$. Here, the relaxation operation amount is a small movement amount for translating the manipulation target M in a direction in which the detected force acts (hereinafter referred to as a small relaxation movement amount), and a small rotation amount for rotating the manipulation target M in a direction of the detected moment (hereinafter referred to as a small relaxation rotation amount). The load relaxation operation amount calculation unit 45 calculates a relaxation operation amount in the work coordinate system $\Sigma\_w$ based on the calculated relaxation movement amount in the external force coordinate system $\Sigma\_e$.

The movement operation amount calculation unit 46 calculates, in the imaging unit coordinate system $\Sigma\_c$, a target operation amount by which the manipulation target M is moved by the gripping unit HND so that the position and posture of the manipulation target M match the target position and posture calculated by target derivation unit 39. The target operation amount is a small movement amount for translating the manipulation target M to the target position (hereinafter referred to as a small target movement amount) and a small rotation amount for rotating the manipulation target M to the target posture (hereinafter referred to as a small target rotation amount). The movement operation amount calculation unit 46 calculates a target operation amount in the work coordinate system $\Sigma\_w$ based on the calculated target operation amount in the imaging unit coordinate system $\Sigma\_c$.

The operation end determination unit 47 determines whether work in which the robot 20 assembles the manipulation target M into the assembly target O ends based on the relaxation operation amount in the work coordinate system $\Sigma\_w$ calculated by the load relaxation operation amount calculation unit 45 and the target operation amount in the work coordinate system $\Sigma\_w$ calculated by the movement operation amount calculation unit 46. Further, the operation end determination unit 47 may determine whether the work in which the robot 20 assembles the manipulation target M into the assembly target O ends based on only the target operation amount in the work coordinate system $\Sigma\_w$ calculated by the movement operation amount calculation unit 46.

The robot control unit 49 calculates a position and a posture in which the force sensor 22 is to move in the work coordinate system $\Sigma\_w$ based on the relaxation operation amount in the work coordinate system $\Sigma\_w$ calculated by the load relaxation operation amount calculation unit 45 and the target operation amount in the work coordinate system $\Sigma\_w$ calculated by the movement operation amount calculation unit 46. Also, the robot control unit 49 controls the robot 20 so that the position and the posture of the force sensor 22 match the calculated position and posture in which the force sensor 22 is to move in the work coordinate system $\Sigma\_w$.

Figure 5:
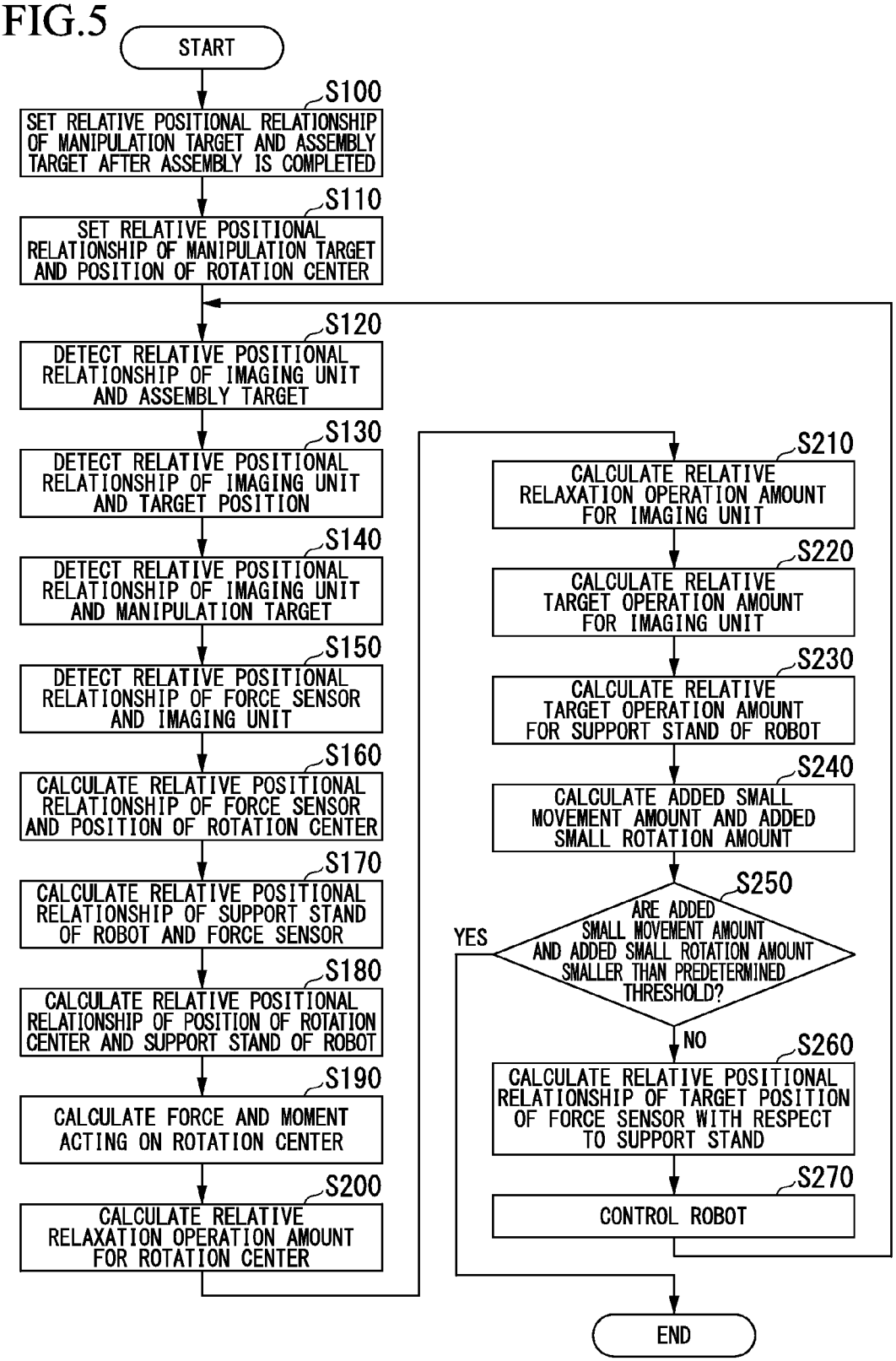
FIG. 5 is a flowchart illustrating an example of a process flow in which the control device 30 controls a robot 20 so as to assemble a manipulation target M and an assembly target O.

Hereinafter, a process in which the control device 30 operates the robot 20 so that the manipulation target M and the assembly target O are assembled will be described with reference to FIG. 5. FIG. 5 is a flowchart illustrating an example of a process flow in which the control device 30 operates the robot 20 so that the manipulation target M and the assembly target O are assembled.

First, the control device 30 sets a position and a posture input from the user via the input reception unit 33, which is a position $p\_o\hat{}m(\rightarrow)$ and a posture $o\_o\hat{}m(\rightarrow)$ of the assembly target O in the manipulation target coordinate system $\Sigma\_m$ in a state in which assembly of the manipulation target M and the assembly target O is completed (step S100).

Then, the control device 30 sets a rotation center position and a rotation center posture input from the user via the input reception unit 33, which is a rotation center position $p\_e\hat{}m$ (→) and a rotation center posture o_eˆm(→) in the manipulation target coordinate system Σ_m (step S110).

Steps S100 to S110 are initial settings for the control device 30 performed by the user. Now, it is assumed that, after step S110, imaging by the imaging unit 10 is started and the control unit 36 acquires the captured image from the image acquisition unit 35.

After the control unit 36 acquires the captured image, the target derivation unit 39 of the control device 30 detects a position p_oˆc(→) and a posture o_oˆc(→) of the assembly target O in the imaging unit coordinate system Σ_c based on the captured image acquired by the image acquisition unit 35 (step S120).

Then, the target derivation unit 39 calculates a target position and a target posture of the manipulation target M in a state in which assembly of the manipulation target M and the assembly target O is completed, which is the target position p_mˆc(d)(→) and the target posture o_mˆc(d)(→) of the manipulation target M in the imaging unit coordinate system Σ_c, using Equation (7) shown below, based on the position p_oˆm(→) and the posture o_oˆc(→) of the assembly target O in the manipulation target coordinate system Σ_m in a state in which assembly of the manipulation target M and the assembly target O is completed, which are set in step S100, and the position p_oˆc(→) and the posture o_oˆc (→) of the assembly target O in the imaging unit coordinate system Σ_c detected in step S120 (step S130)

$$\vec{p}_m^c(d) = \vec{p}_o^c + \hat{R}_o^c \vec{p}_m^o$$

$$\hat{R}_m^c(d) = \hat{R}_o^c \hat{R}_m^o \quad (7)$$

Here, "(d)" of the target position p_mˆc(d)(→) and the target posture o_mˆc(d)(→) of the manipulation target M in the imaging unit coordinate system Σ_c is a label added to distinguish between the position p_mˆc(→) and the posture o_mˆc(→) of the manipulation target M in the imaging unit coordinate system Σ_c detected by the rotation center position calculation unit 41 in step S140.

The process from step S120 to step S130 is a process in which the control unit 36 indirectly calculates a relative position and a relative posture of the manipulation target M in a state in which assembly of the manipulation target M and the assembly target O is completed and the imaging unit 10, based on the relative position and the relative posture of the imaging unit 10 and the assembly target O, and the relative positional relationship (the position and the posture) of the manipulation target M and the assembly target O in a state in which assembly of the manipulation target M and the assembly target O is completed.

Then, the rotation center position calculation unit 41 detects the position p_mˆc(→) and the posture o_mˆc(→) of the manipulation target M in the imaging unit coordinate system Σ_c from the acquired captured image (step S140).

Then, the rotation center position calculation unit 41 detects a position p_cˆt(→) and a posture o_cˆt (→) of the imaging unit 10 in the tool coordinate system Σ_t from the acquired captured image (step S150).

Then, the rotation center position calculation unit 41 calculates a position p_eˆt(→) and a posture o_eˆt(→) of the rotation center in the tool coordinate system Σ_t using Equation (8) shown below, based on the position p_mˆc(→) and the posture o_mˆc(→) of the manipulation target M in the imaging unit coordinate system Σ_c calculated in step S140 and the position p_cˆt(→) and the posture o_cˆt(→) of the imaging unit 10 in the tool coordinate system Σ_t calculated in step S150 (step S160).

$$\vec{p}_e^t = \vec{p}_c^t + \hat{R}_c^t (\vec{p}_m^c + \hat{R}_m^c \vec{p}_e^m)$$

$$\hat{R}_e^t = \hat{R}_c^t \hat{R}_m^c \hat{R}_e^m \quad (8)$$

Here, the process of step S160 is a process of detecting a change in a relative positional relationship between the force sensor 22 and the rotation center position and the rotation center posture described above. The fact that the position p_eˆt(→) and the posture o_eˆt(→) of the rotation center in the tool coordinate system Σ_t calculated in step S160 are different from the values calculated in the previous routine shows that the relative positional relationship between the force sensor 22 and the rotation center position and the rotation center posture is changed due to an external force. By detecting this change, the control unit 36 can perform control so that the robot 20 always rotates the manipulation target M based on the rotation center posture around the rotation center position, based on the rotation center position and the rotation center posture with respect to the force sensor 22 after the change even when the rotation center position and the rotation center posture with respect to the force sensor 22 are changed due to an external force.

Then, the rotation center position calculation unit 41 calculates the position p_tˆw(→) and the posture o_tˆw(→) of the force sensor 22 in the work coordinate system Σ_w based on forward kinematics (step S170).

Then, the rotation center position calculation unit 41 calculates the position p_wˆe(→) and the posture o_wˆe(→) of the support stand of the robot 20 in the external force coordinate system Σ_e using Equation (9) shown below, based on the rotation center position p_eˆt(→) and the rotation center posture o_eˆt(→) in the tool coordinate system Σ_t calculated in step S160, and the position p_tˆw (→) and the posture o_tˆw(→) of the force sensor 22 in the work coordinate system Σ_w calculated in step S170 (step S180).

$$\vec{p}_w^e = \vec{p}_t^e + \hat{R}_t^e \vec{p}_w^t \quad (9)$$

$$\hat{R}_w^e = \hat{R}_t^e \hat{R}_w^t$$

Here, through the process of the following step S190, the control unit 36 can calculate the force and the moment acting on the rotation center position due to the force and the moment acting on the force sensor 22 by calculating the position p_wˆe(→) and the posture o_wˆe(→) of the support stand of the robot 20 in the external force coordinate system Σ_e through the process of step S180.

Then, the external force calculation unit 43 calculates a force (that is, a force acting on the rotation center position) fˆe(→) and a moment (that is, moment generated in the rotation center position) mˆe(→) in the external force coordinate system Σ_e using a Newton-Euler equation (10) shown below, based on the force and the moment detected by the force sensor 22, which are the force fˆt(→) and the moment mˆt(→) in the tool coordinate system Σ_t (step S190).

$$\vec{f}^e = \hat{R}_w^e \{\hat{R}_t^w \vec{f}^t - m\hat{E}(\vec{g} - \vec{p}_c^w)\}$$

$$\vec{m}^e = \hat{R}_w^e \{\dot{\vec{I}} \vec{o}_c^w + \vec{o}_c^w \times \vec{I} \vec{o}_c^w + \hat{R}_t^w (\vec{m}^t + \vec{p}_e^t \times \vec{f}^t - \vec{p}_g^t \times m\hat{R}_w^t \vec{g})\} \quad (10)$$

Here, the upper equation in Equation (10) described above shows that a component fˆe(→) of the external force acting on the rotation center position of the manipulation target M is represented by a component obtained by subtracting a component $mE(\hat{\ })g(\rightarrow)$ due to gravity and a component $mE(\hat{\ })p\_c\hat{\ }w(\rightarrow)(\bullet\bullet)$ due to an inertial motion by the arm unit ARM of the robot 20 from a component $f\hat{\ }t(\rightarrow)$ of the force detected by the force sensor 22. Further, a first letter with "(• •)" indicates a variable differentiated twice with respect to time. Further, a matrix $E(\hat{\ })$ is a unit matrix, a vector $g(\rightarrow)$ is a vector indicating acceleration of gravity, and scalar m indicates a mass of the manipulation target M.

Similarly to the upper equation, the lower equation shows that moment mAe generated at the rotation center due to the external force acting on the manipulation target M is represented by a component obtained by subtracting a component $p\_g\hat{\ }t(\rightarrow)\times mR\_w\hat{\ }t(\hat{\ })g(\rightarrow)$ of the moment due to the gravity from a component obtained by adding a component $I(\hat{\ })o\_c\hat{\ }w(\rightarrow)(\bullet\bullet)$ of torsional moment, a component $o\_c\hat{\ }w(\rightarrow)(\bullet)\times I(\hat{\ })o\_c\hat{\ }w(\rightarrow)(\bullet)$ of moment due to the Coriolis force, moment $m\hat{\ }t(\rightarrow)$ detected by the force sensor 22, and a component $p\_e\hat{\ }t(\rightarrow)\times f\hat{\ }t(\rightarrow)$ of moment by a component $f\hat{\ }t(\rightarrow)$ of the force detected by the force sensor 22.

Then, the load relaxation operation amount calculation unit 45 calculates a small relaxation movement amount $\Delta p\hat{\ }e(\rightarrow)$ and a small relaxation rotation amount $\Delta o\hat{\ }e(\rightarrow)$ of the relaxation operation amount of the manipulation target M in the external force coordinate system $\Sigma\_e$ using Equation (11) shown below, based on the force $f\hat{\ }e(\rightarrow)$ and the moment $m\hat{\ }e(\rightarrow)$ in the external force coordinate system $\Sigma\_e$ calculated in step S190 (step S200).

$$\Delta \vec{P}^e = \frac{1}{\hat{M}_p s^2 + \hat{D}_p s + \hat{K}_p} \vec{F}^e \quad (11)$$

$$\Delta \vec{O}^e = \frac{1}{\hat{M}_o s^2 + \hat{D}_o s + \hat{K}_o} \vec{M}^e$$

Here, $\Delta P\hat{\ }e(\rightarrow)$ and $\Delta O\hat{\ }e(\rightarrow)$ of Equation (11) used in step S200 are obtained by performing a Laplace transform on $\Delta p\hat{\ }e(\rightarrow)$ and $\Delta o\hat{\ }e(\rightarrow)$ respectively. Further, Equation (11) varies depending on a motion model used to determine an operation amount (small movement amount and small rotation amount) for movement in a direction in which the external force is relaxed when the external force is applied to the rotation center position set in the manipulation target M. In this embodiment, as shown in Equation (11) described above, the motion model represented by an inertial mass matrix $M\_p(\hat{\ })$, a damper coefficient matrix $D\_p(\hat{\ })$, and a spring multiplier matrix $K\_p(\hat{\ })$ regarding the small movement amount, and an inertial mass matrix $M\_o(\hat{\ })$, a damper coefficient matrix $D\_o(\hat{\ })$, and a spring multiplier matrix $K\_o(\hat{\ })$ regarding the small rotation amount is adopted. The control performed by such a motion model is called impedance control among compliant motion controls. Further, the scalar s is a variable used for the Laplace transform. The compliant motion control is not limited to impedance control, and for example, stiffness control or damping control may be applied.

Then, the load relaxation operation amount calculation unit 45 calculates a small relaxation movement amount $\Delta p\_t\hat{\ }w(i)(\rightarrow)$ and a small relaxation rotation amount $\Delta o\_t\hat{\ }w(i)(\rightarrow)$ as the relaxation operation amount of the force sensor 22 in the work coordinate system $\Sigma\_w$ using Equation (12) shown below, based on the relaxation operation amount of the manipulation target M in the external force coordinate system $\Sigma\_e$ calculated in step S200 (step S210).

$$\Delta \vec{p}_t^w(i) = \hat{R}_e^w [\Delta \vec{p}^e + \Delta \vec{o}^e \times p_t^e]$$

$$\Delta \hat{R}_t^w(i) = \hat{R}_e^w \hat{R}(\Delta \vec{o}^e) \hat{R}_w^e \quad (12)$$

Here, "(i)" in the small relaxation movement amount $\Delta p\_t\hat{\ }w(i)(\rightarrow)$ and the small relaxation rotation amount $\Delta o\_t\hat{\ }w(i)(\rightarrow)$ that constitute the relaxation operation amount is a label for distinguishing between the relaxation operation amount and the target operation amount. The robot control unit 49 of the control unit 36 can control the robot 20 to move the position and the posture of the force sensor 22 to a position in which the force and the moment acting on the rotation center position are relaxed, based on the relaxation operation amount in the work coordinate system $\Sigma\_w$ calculated by the load relaxation operation amount calculation unit 45 through the process from step S200 to step S210.

Then, the movement operation amount calculation unit 46 calculates a target operation amount for moving the manipulation target M to the target position and the target posture, which is the small target movement amount $\Delta p\_m\hat{\ }c(\rightarrow)$ and the small target rotation amount $\Delta o\_m\hat{\ }c(\rightarrow)$ as the target operation amount in the imaging unit coordinate system $\Sigma\_c$ using Equation (13) shown below, based on the target position $p\_m\hat{\ }c(d)(\rightarrow)$ and the target posture $o\_m\hat{\ }c(d)(\rightarrow)$ of the manipulation target M in the imaging unit coordinate system $\Sigma\_c$ in a state in which assembly of the manipulation target M and the assembly target O is completed, which is calculated in step S130, and the position $p\_m\hat{\ }c(\rightarrow)$ and the posture $o\_m\hat{\ }c(\rightarrow)$ of the manipulation target M in the imaging unit coordinate system $\Sigma\_c$ detected in step S140 (step S220).

$$\Delta \vec{p}_m^c(v) = \hat{K}_p (\vec{p}_m^c(d) - \vec{p}_m^c)$$

$$\Delta \vec{o}_m^c(v) = \hat{K}_o \vec{o} (\hat{R}_m^c(d)(\hat{R}_m^c)^{-1}) \quad (13)$$

Then, the movement operation amount calculation unit 46 calculates the small target movement amount $\Delta p\_t\hat{\ }w(v)(\rightarrow)$ and the small target rotation amount $\Delta o\_t\hat{\ }w(v)(\rightarrow)$ as the target operation amount of the force sensor 22 in the work coordinate system $\Sigma\_w$ using Equation (14) shown below, based on the target operation amount of the manipulation target M in the imaging unit coordinate system $\Sigma\_c$ calculated in step S220 (step S230).

$$\Delta \vec{p}_t^w(v) = \hat{R}_e^w [\hat{R}(\Delta \vec{o}^e) \hat{R}_m^e \{\hat{R}_c^m \Delta \vec{p}_m^c(v) + \vec{o}(\hat{R}_c^m \hat{R}(\Delta$$
$$\vec{o}_m^c(v))\hat{R}_m^c)\times(\vec{p}_e^m + \Delta \vec{p}^e)\} + \vec{o}(\hat{R}(\Delta$$
$$\vec{o}^e)\hat{R}_m^e\hat{R}_c^m\hat{R}(\Delta \vec{o}_m^c(v))\hat{R}_m^c\hat{R}_e^m\hat{R}(\Delta \vec{o}^e)^{-1})\times \vec{p}_t^e]$$

$$\Delta \vec{o}_t^w(v) = \vec{o}((\hat{R}(\Delta \vec{o}^e)\hat{R}_m^e)[\hat{R}(\Delta \vec{o}^e)\hat{R}_m^e\hat{R}_c^m\hat{R}](\Delta$$
$$\vec{o}_m^c(v))\hat{R}_m^c\hat{R}_e^m\hat{R}(\Delta \vec{o}^e)^{-1}](\hat{R}(\Delta \vec{o}^e)\hat{R}_m^e)^{-1}) \quad (14)$$

Here, "(v)" in the small target movement amount $\Delta p\_t\hat{\ }w(v)(\rightarrow)$ and the small target rotation amount $\Delta o\_t\hat{\ }w(v)(\rightarrow)$ which constitute a target operation amount is a label for distinguishing between the target operation amount and the relaxation operation amount.

Then, the operation end determination unit 47 calculates an added small movement amount $\Delta p\_t\hat{\ }w(\rightarrow)$ and an added small rotation amount $\Delta o\_t\hat{\ }w(\rightarrow)$ by adding the relaxation operation amount calculated in step S210 and the target operation amount calculated in step S230 as in Equation (15) shown below (step S240).

$$\Delta \vec{p}_t^w = \Delta \vec{p}_t^w(i) + \Delta \vec{p}_t^w(v)$$

$$\Delta \hat{R}_t^w = \hat{R}(\Delta \vec{o}_t^w(v))\hat{R}(\Delta \vec{o}_t^w(i)) \quad (15)$$

Then, the operation end determination unit 47 determines whether both of the added small movement amount Δp_t^w (→) and the added small rotation amount Δo_t^w (→) calculated in step S240 are smaller than respective corresponding predetermined thresholds (step S250). Further, the respective corresponding predetermined thresholds are set separately. When both of the added small movement amount Δp_t^w(→) and the added small rotation amount Δo_t^w(→) are smaller than the respective corresponding predetermined thresholds (step S250—Yes), the operation end determination unit 47 determines that it is no longer necessary to move the manipulation target M, and ends the process.

On the other hand, when the operation end determination unit 47 determines that one or both of the added small movement amount Δp_t^w(→) and the added small rotation amount Δo_t^w(→) are not smaller than the respective corresponding predetermined thresholds (step S250—No), the robot control unit 49 calculates the target position p_t^w (d)(→) and the target posture o_t^w (d)(→) of the force sensor 22 in the work coordinate system Σ_w using Equation (16) shown below, based on the relaxation operation amount calculated in step S210 and the target operation amount calculated in step S230 (step S260).

$$\vec{p}_t^w(d) = \vec{p}_t^w + \Delta \vec{p}_t^w$$

$$\hat{R}_t^w(d) = \hat{R}_t^w \hat{R}(\Delta \vec{o}_t^w) \tag{16}$$

Further, the operation end determination unit 47 may be configured to determine whether both of the small target movement amount Δp_t^w (v)(→) and the small target rotation amount Δo_t^w(v)(→) calculated in step S230 are smaller than respective corresponding predetermined thresholds, instead of being configured to determine whether both of the added small movement amount Δp_t^w(→) and the added small rotation amount Δo_t^w (→) calculated in step S240 are smaller than respective corresponding predetermined thresholds. Further, the operation end determination unit 47 may be configured to determine whether a value obtained from an arbitrary function consisting of Δp_t^w (→)(i), Δo_t^w(i), Δp_t^w(→)(v) and Δo_t^w(v) is smaller than a predetermined threshold (whether it is no longer necessary to move the manipulation target M) using the function according to a property of predetermined work performed by the robot 20.

Then, the robot control unit 49 controls the robot 20 to move the force sensor 22 so that the position and the posture of the force sensor 22 match the target position p_t^w(d)(→) and the posture o_t^w(d)(→) of the force sensor 22 in the work coordinate system Σ_w calculated in step S260 (step S270). The control unit 36 repeats the processes of steps S120 to S270 until it is determined in the determination of step S250 that it is no longer necessary to move the manipulation target M, to perform control so that the robot 20 performs predetermined work.

Further, the rotation center position calculation unit 41 may include a marker indicating the position of the force sensor 22 described above, for example, when the force sensor 22 cannot be imaged by the imaging unit 10 because the force sensor 22 is inside the arm unit ARM and not visible from the outside in the process from step S150 to step S180 or may sequentially calculate the position p_t^e(→) and the posture o_t^e(→) of the force sensor 22 in the external force coordinate system Σ_e using Equations (17) to (19) shown below, based on a relative positional relationship in an initial state between the force sensor 22 and the rotation center position and the rotation center posture set by a user.

$$\Delta \vec{p}_m^c(t) = \vec{p}_m^c(t) - \vec{p}_m^c(t-1) - \Delta \vec{p}_m^c(v) - \lfloor \hat{R}_m^c \hat{R}_e^m \hat{R}(\Delta \vec{o}^e) \rfloor \{\Delta \vec{p}^e(t) - \Delta \vec{p}^e(t-1) + (\Delta \vec{o}^e(t) - \Delta \vec{o}^e(t-1)) \times \vec{p}_m^e\}$$

$$\hat{R}_m^c(t) = \{\hat{R}(\vec{o}_m^c(v))^{-1}[\hat{R}_m^c \hat{R}_e^m \hat{R}(\Delta \vec{o}^e)]\hat{R}(\Delta \vec{o}^e(t) - \Delta \vec{o}^e(t-1))[\hat{R}_m^c \hat{R}_e^m \hat{R}(\Delta \vec{o}^e)]^{-1}\}^{-1} \hat{R}(\vec{o}_m^c(t) - \vec{o}_m^c(t-1))$$

$$\Delta \vec{o}_m^c(t) = \vec{o}(\hat{R}_m^c(t)) \tag{17}$$

$$\Delta \vec{p}^m(t) = \hat{R}_c^m \Delta \vec{p}_m^c(t)$$

$$\Delta \hat{R}^m(t) = \hat{R}_c^m \hat{R}_m^c(t) \hat{R}_m^c$$

$$\Delta \vec{o}^m(t) = \vec{o}(\hat{R}^m(t)) \tag{18}$$

$$\vec{p}_t^e(t) = [[\hat{R}(\Delta \vec{o}^e)\hat{R}_m^e]\hat{R}^m(t)[\hat{R}(\Delta \vec{o}^e)\hat{R}_m^e]^{-1}]^{-1}[\vec{p}_t^e(t-1) - \hat{R}(\Delta \vec{o}^e)\hat{R}_m^e[\Delta \vec{p}^m(t) + \Delta \vec{o}^m(t) \times (\vec{p}_e^m - \Delta \vec{p}^e)]]$$

$$\hat{R}_t^e(t) = [[\hat{R}(\Delta \vec{o}^e)\hat{R}_m^e]\hat{R}^m(t)[\hat{R}(\Delta \delta^e)\hat{R}_m^e]^{-1}]^{-1}\hat{R}_t^e(t-1))$$

$$\vec{o}_t^e(t) = \vec{o}(\hat{R}_t^e(t)) \tag{19}$$

Equations (17) to (19) above are equations for calculating an amount of shift of the relative positional relationship between the force sensor 22 and the manipulation target M by subtracting a movement amount of the robot 20 from the movement amount of the manipulation target M detected from the captured image. Further, the movement amount of the robot 20 is calculated based on the initial state of the robot 20 by the control unit 36. The configuration using the relative positional relationship in the initial state of the force sensor 22 and the rotation center position and the rotation center posture set by the user, and Equations (17) to (19) above is useful because the position and the posture of the manipulation target M and the position and the posture of the force sensor 22 can be tracked when the manipulation target M and the force sensor 22 are not included in an imaging range of the imaging unit 10, that is, even when the position of the force sensor 22 cannot be detected using the marker indicating the position of the force sensor 22.

Even when the force sensor 22 cannot be imaged by the imaging unit 10, the rotation center position calculation unit 41 can perform the process of step S150 to step S180 by performing sequential calculation using Equations (17) to (19) above, as in the case in which the force sensor 22 can be imaged by the imaging unit 10. As a result, the control unit 36 can control the robot 20 to perform predetermined work based on the relative positional relationship between the force sensor 22 and the predetermined position set in the manipulation target M. Further, the case in which the force sensor 22 cannot be imaged by the imaging unit 10 is, for example, a case in which the force sensor 22 is covered with a member of the arm unit ARM or a case in which the arm unit ARM including the force sensor 22 is shifted from the angle of view of the imaging unit 10.

As described above, the robot 20 of the robot system 1 according to the first embodiment rotates the manipulation target M around the rotation center position of the manipulation target M and relatively moves the manipulation target M with respect to the assembly target O using the gripping unit HND based on the captured image including the gripping unit HND and the manipulation target M. Therefore, the robot can perform good assembly work.

Further, the robot 20 relatively moves the manipulation target M with respect to the assembly target O through rotation and translation using the rotation center in the case of rotation as a coordinate origin moving with the manipulation target M. Therefore, the robot can perform good assembly work.

Further, the robot 20 can sequentially relatively move the manipulation target M with respect to the assembly target O, and thus, perform good assembly work with high precision.

Further, the robot 20 performs compliant motion control according to a motion characteristic set in a predetermined position and each axial direction. Therefore, the robot 20 can assemble the manipulation target M with respect to the assembly target O without damaging the assembly target O.

Further, the robot 20 derives the relative positional relationship between the position set in the manipulation target M and the position set in the gripping unit HND based on the captured image, and updates the rotation center position based on the derived positional relationship. Therefore, even when the positional relationship of the gripping unit HND and the rotation center is shifted due to an external force, the robot 20 can relatively move the manipulation target M with respective to the assembly target O around the shifted rotation center and, as a result, perform good assembly work.

Further, the robot 20 derives a relative positional relationship between the position set in the gripping unit HND and the position set in the manipulation target M, and updates the rotation center position based on the derived positional relationship and the relative positional relationship between the position set in the manipulation target M and the rotation center position. Therefore, even when the positional relationship between the gripping unit HND and the rotation center position is shifted due to an external force, the robot 20 can indirectly recognize the shifted rotation center position from the relative positional relationship between the position set in the gripping unit HND and the rotation center position through the position set in the manipulation target M and, as a result, can relatively move the manipulation target M with respect to the assembly target O around the shifted rotation center position.

Further, the robot 20 derives the relative positional relationship between the position set in the gripping unit HND and the rotation center position based on the position of the marker indicating the position of the force sensor 22 detected from the captured image, and updates the rotation center position based on the relative positional relationship between the position set in the gripping unit HND and the rotation center position. Therefore, even when the force sensor 22 is covered with a member of the arm unit ARM of the robot 20, the robot 20 can recognize the position of the manipulation target M using the position of the marker indicating the force sensor 22 as a mark and, as a result, can perform good assembly work.

Further, the robot 20 derives the relative positional relationship between the position set in the gripping unit HND and the rotation center position based on the position and the posture in the initial state of the force sensor 22, and updates the rotation center position based on the derived relative positional relationship between the position set in the gripping unit HND and the rotation center position. Therefore, even when the arm unit ARM of the robot 20 including the force sensor 22 is shifted from an angle of view of the imaging unit 10, the robot 20 can recognize the position of the manipulation target M and, as a result, can perform good assembly work.

Second Embodiment

Hereinafter, a second embodiment of the present invention will be described with reference to the drawings. The robot system 2 according to the second embodiment may have a configuration in which a dual-arm robot is included as the robot 25, in place of the configuration in which the single arm robot is included as the robot 20. Further, in the second embodiment, the same constituent units as those in the first embodiment are denoted with the same reference signs.

Figure 6:
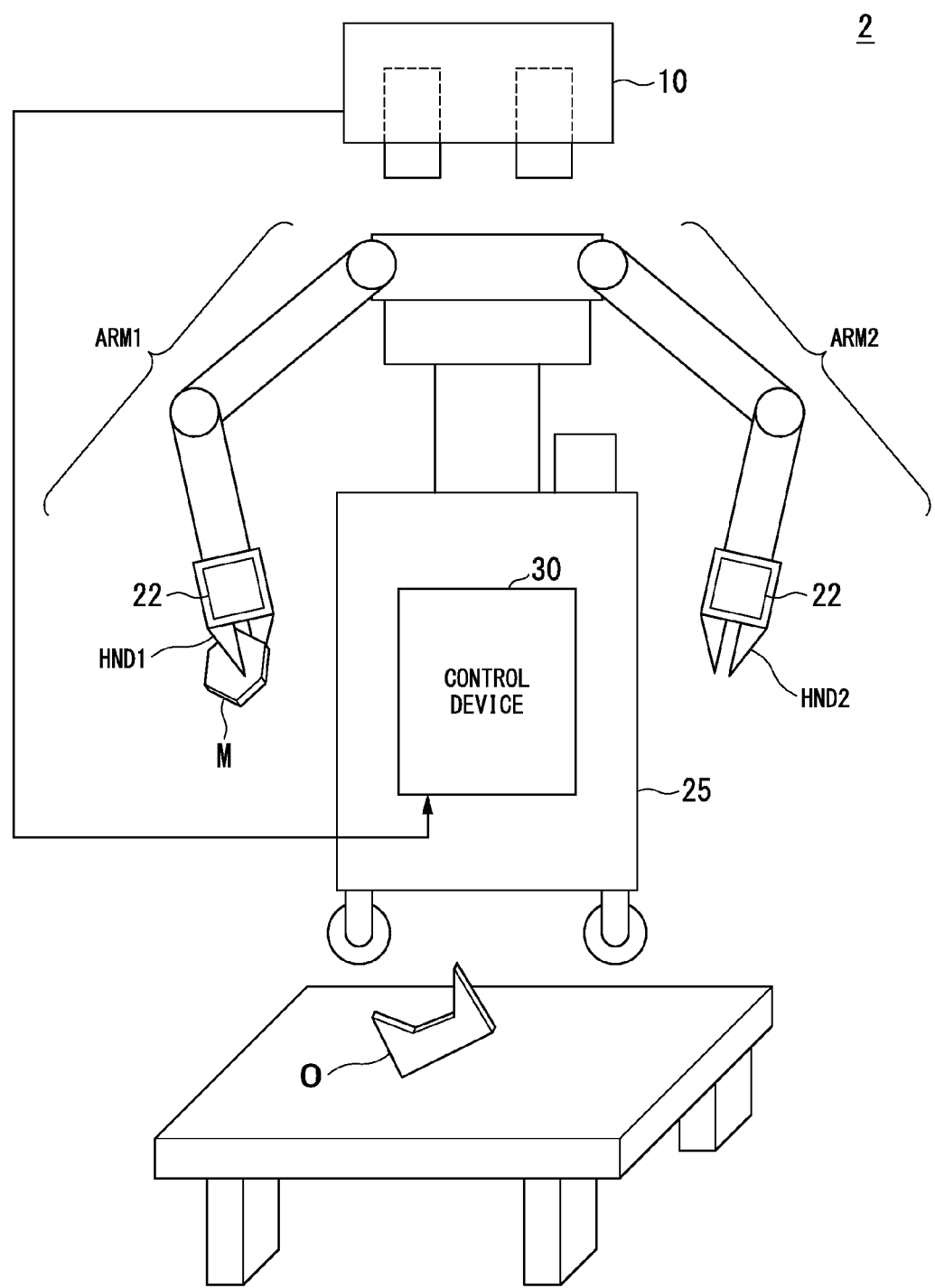
FIG. 6 is a configuration diagram illustrating an example of a robot system 2 according to a second embodiment.

FIG. 6 is a configuration diagram illustrating an example of the robot system 2 according to the second embodiment. The robot system 2 includes an imaging unit 10, a robot 25, and a control device 30.

In the second embodiment, an assembly target O is installed on a stand such as a table by a jig or the like, and a manipulation target M is assembled through the predetermined work described in the first embodiment, by any one arm of the robot 25 which is a dual-arm robot. Further, the assembly target O may be gripped by a gripping unit HND2 of the robot 25 and the predetermined work described in the first embodiment may be performed by a gripping unit HND1. Further, in this case, a role of the gripping unit HND1 and the gripping unit HND2 may be reversed.

The robot 25 is, for example, a dual-arm robot in which the gripping unit HND1, the gripping unit HND2, a force sensor 22, an arm unit ARM1, an arm unit ARM2, and a plurality of actuators, which are not illustrated, are included in each arm, as illustrated in FIG. 6.

Each arm of the robot 25 is a 6-axis vertical multi-joint type. One arm can perform an operation with degrees of freedom defined by six axes through an operation in which the support stand, the arm unit ARM1, and the gripping unit HND1 cooperate using the actuator, and the other arm can perform an operation with degrees of freedom defined by six axes through an operation in which the support stand, the arm unit ARM2, and the gripping unit HND2 cooperate using the actuator. Further, each arm of the robot 20 may operate with 5 degrees of freedom (on 5 axes) or less or may operate with 7 degrees of freedom (on 7 axes) or more.

While the robot 25 performs an operation controlled by the control device 30 described in the first embodiment using the arm including the gripping unit HND1 and the arm unit ARM1, the same operation may be performed using the arm including the gripping unit HND2 and the arm unit ARM2. Further, each of the gripping unit HND1 and the gripping unit HND2 is an example of a hand. The robot 25 is connected to the control device 30, for example, by a cable so that the robot 25 can communicate with the control device 30. Wired communication via the cable is performed according to, for example, a standard such as Ethernet (registered trademark) or USB. Further, the robot 25 and the control device 30 may be connected through wireless communication performed according to a communication standard such as Wi-Fi (registered trademark).

Further, the robot 25 is controlled by the control device 30 mounted inside the robot 25 as illustrated in FIG. 6, the control device 30 may be installed outside the robot 25, in place of such a configuration.

As described above, since the robot 25 of the robot system 2 according to the second embodiment is the dual-arm robot and the predetermined work described in the first embodiment is performed by either or both of the two arms of the dual-arm robot, it is possible to obtain the same effects as in the first embodiment.

Third Embodiment

Hereinafter, a third embodiment of the present invention will be described with reference to the drawings. Further, in the third embodiment, the same constituent units as in the first embodiment are denoted with the same reference signs. In predetermined work, a robot system 1 according to the third embodiment assembles, for example, a wrench (an example of a manipulation target M) gripped by a gripping unit HND and a bolt (an example of an assembly target O), and then tightens the bolt with the gripped wrench.

Figure 7A:
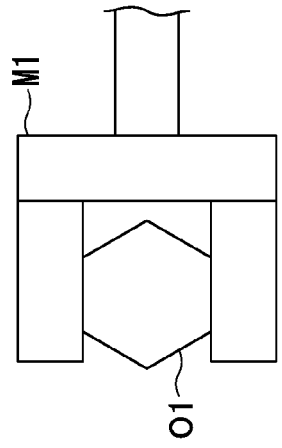
FIGS. 7A to 7D are diagrams schematically illustrating an example of predetermined work performed by a robot system 1 according to a third embodiment.
Figure 7B:
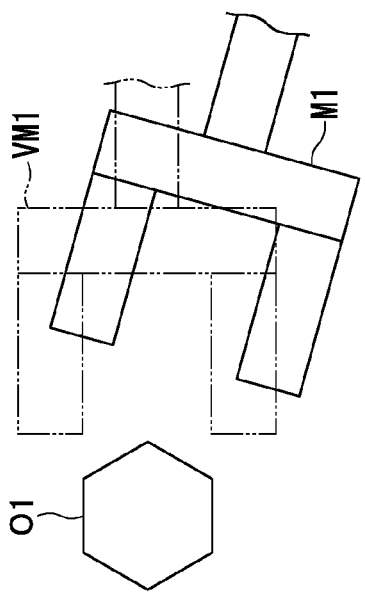

Here, the predetermined work performed by the robot system 1 according to the third embodiment will be described with reference to FIGS. 7A to 7D. FIGS. 7A to 7D are diagrams schematically illustrating an example of the predetermined work performed by the robot system 1 according to the third embodiment. FIG. 7A illustrates a state of a predetermined initial position before a wrench M1 gripped by the robot 20 is assembled with a bolt O1. The robot system 1 moves the wrench M1 to a position (a position immediately before the bolt O1) of a wrench VM1 shown by a two-dot chain line in FIG. 7A. Here, an image showing a state of the wrench VM1 is set in the robot system 1 in advance, and the robot system 1 moves the gripping unit HND through the process described with reference to FIG. 5 in the first embodiment so as to realize such a state. A state in which the wrench M1 is assembled with the bolt O1 by the robot 20 is illustrated in FIG. 7B. The robot system 1 moves the gripping unit HND from the state of the wrench VM1 illustrated in FIG. 7A to the state in which the wrench M1 and the bolt O1 are assembled, which is illustrated in FIG. 7B, through the process described with reference to FIG. 5. Here, an image showing the wrench M1 and the bolt O1 in the state illustrated in FIG. 7B is set in the robot system 1 in advance, and the robot system 1 moves the gripping unit HND through the process described with reference to FIG. 5 in the first embodiment so as to realize such a state.

Figure 7D:
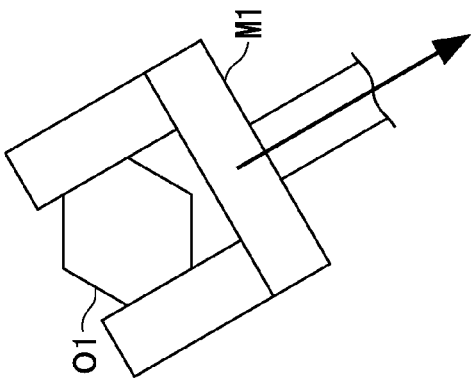
Figure 7C:
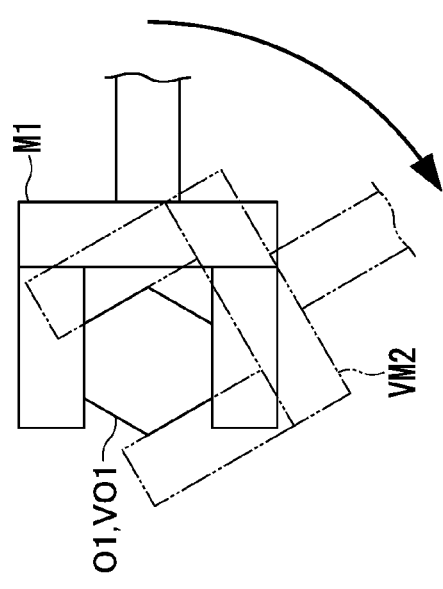

In FIG. 7C, a state in which the bolt O1 is rotated 60° by the wrench M1 gripped by the robot 20 is illustrated. An image showing a rotated state (for example, a state of a wrench VM2 and a bolt VO1 indicated by a two-dot chain line in FIG. 7C) is set in the robot system 1 in advance, and the robot system 1 moves the gripping unit HND based on the process described with reference to FIG. 5 so as to realize such a state. Further, the bolt O1 and the bolt VO1 are shown in an overlapped manner in FIG. 7B due to their regular hexagons.

In FIG. 7D, a state in which the bolt O1 is rotated by the wrench M1 gripped by the robot 20 is illustrated. When the bolt O1 is rotated by the wrench M1 illustrated in FIG. 7D, the robot system 1 moves the wrench M1 to a position apart by a predetermined distance from the bolt O1. Here, an image showing a state in which the wrench M1 moves to the position apart by a predetermined distance from the bolt O1 is set in the robot system 1 in advance, and the robot system 1 moves the gripping unit HND through the process described with reference to FIG. 5 in the first embodiment so as to realize such a state. Also, the robot system 1 moves the gripping unit HND until the wrench M1 moves from the position apart by the predetermined distance from the bolt O1 to the initial position. The robot system 1 tightens the bolt O1 with the wrench M1 by repeating the process of performing the operations illustrated in FIGS. 7A to 7D.

Figure 8:
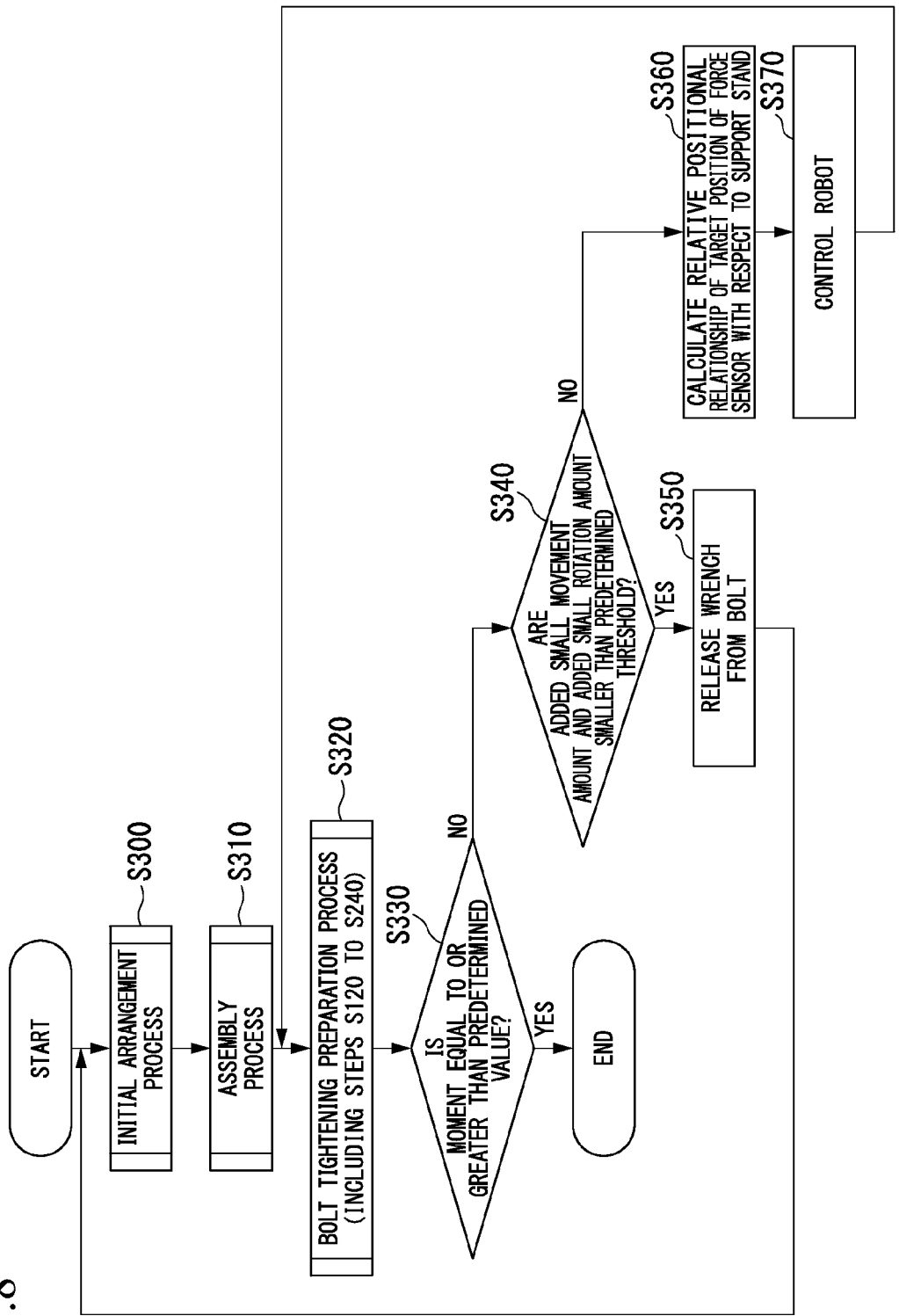
FIG. 8 is a flowchart illustrating an example of a process flow in which a control unit 36 of a control device 30 operates a robot 20 to tighten a bolt O1 with a wrench M1.

Hereinafter, a process in which the control unit 36 of the control device 30 operates the robot 20 to tighten the bolt O1 with the wrench M1 will be described with reference to FIG. 8. FIG. 8 is a flowchart illustrating an example of a process flow in which the control unit 36 of the control device 30 operates the robot 20 to tighten the bolt O1 with the wrench M1.

In the following description, the robot system 1 is assumed to have already performed the process from steps S100 to S110 illustrated in FIG. 5. First, the control unit 36 moves the gripping unit HND of the robot 20 until the wrench M1 gripped by the gripping unit HND is arranged in the predetermined initial position described above in an initial arrangement process (step S300). Here, the initial arrangement process refers to a process from step S120 to step S270 illustrated in FIG. 5.

Then, the control unit 36 assembles the wrench M1 and the bolt O1 through an assembling process (step S310). Here, the assembling process refers to a process of moving the gripping unit HND until the wrench M1 and the bolt O1 enter the state illustrated in FIG. 7B and assembling the wrench M1 with the bolt O1 through the process from step S120 to step S270 illustrated in FIG. 5.

Then, the control unit 36 gets ready to move the gripping unit HND gripping the wrench M1 until the wrench M1 and the bolt O1 enter the state illustrated in FIG. 7D through a bolt tightening preparation process (step S320). Here, the bolt tightening preparation process refers to a process of calculating an added small movement amount and an added small rotation amount for moving the gripping unit HND and rotating the bolt O1 with the wrench M1 through the process from step S120 to step S240 illustrated in FIG. 5.

Then, the control unit 36 determines whether tightening of the bolt O1 is completed by determining whether the moment (corresponding to tightening torque) calculated using Equation (10) described above in step S320 is equal to or greater than a predetermined value (step S330). When the control unit 36 determines that the calculated moment is equal to or greater than the predetermined value (step S330—Yes), the control unit 36 determines that tightening of the bolt O1 is completed, and ends the process. On the other hand, when the control unit 36 determines that the calculated moment is smaller than the predetermined value (step S330—No), the control unit 36 determines whether both of the added small movement amount and the added small rotation amount calculated using Equation (15) described above in step S320 are smaller than corresponding predetermined thresholds (step S340).

When the control unit 36 determines that both of the added small movement amount and the added small rotation amount are equal to or greater than the corresponding predetermined thresholds (step S340—No), the control unit 36 determines that the wrench M1 and the bolt O1 do not reach the state illustrated in FIG. 7D, and calculates the target position and posture of the force sensor 22 in the work coordinate system $\Sigma\_w$ based on the relaxation operation amount and the target operation amount calculated in step S320 (step S360). Then, the control unit 36 further rotates the bolt O1 with the wrench M1 by controlling the robot 20 to move the force sensor 22 so that the position and the posture of the force sensor 22 match the target position and the target posture of the force sensor 22 in the work coordinate system $\Sigma\_w$ calculated in step S360 (step S370). Further, since step S360 is the same process as step S260 and step S370 is the same process as step S270, detailed description thereof will be omitted. On the other hand, when the control unit 36 determines that both of the added small movement amount and the added small rotation amount are smaller than the corresponding predetermined thresholds (step S340—Yes), the control unit 36 determines that the wrench M1 and the bolt O1 have reached the state illustrated in FIG. 7D, releases the wrench M1 from the bolt O1 (step S350), and then, performs the process of step S300.

As described above, based on the process described in FIG. 5 in the first embodiment and the process of step S330 according to the moment corresponding to the tightening torque, the robot system 1 according to the third embodiment can combine control based on visual servo and compliant motion control based on a force sensor, and reliably tighten the bolt O1 with the wrench M1 gripped by the gripping unit HND.

Further, a program for realizing the functions of any constituent units in the above-described device (for example, the robot system 1 or 2) may be recorded in a computer-readable recording medium and loaded into and executed by a computer system. Further, the "computer system" referred to herein includes an OS (Operating System) or hardware such as a peripheral device. Further, the "computer-readable recording medium" includes a flexible disk, a magnetic optical disc, a ROM (Read Only Memory), a portable medium such as a CD (Compact Disk)-ROM, or a storage device such as a hard disk built in the computer system. Further, the "computer-readable recording medium" also includes a recording medium that holds a program for a certain time, such as a volatile memory (RAM: Random Access Memory) inside a computer system including a server and a client when a program is transmitted via a network such as the Internet or a communication line such as a telephone line.

Further, the above-described program may be transmitted from a computer system in which the program is stored in a storage device or the like to other computer systems via a transmission medium or by transmission waves in the transmission medium. Here, the "transmission medium" for transmitting the program refers to a medium having a function of transmitting information, such as a network (communication network) such as the Internet or a communication line such as a telephone line.

Also, the above-described program may be a program for realizing some of the above-described functions. Alternatively, the program may be a program capable of realizing the above-described functions in combination with a program previously stored in a computer system, that is, a differential file (a differential program).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A robot comprising:
    a hand; and
    a control unit configured to operate the hand,
    wherein the control unit is configured to move a first object toward a second object and is configured to operate the hand to control a position and a posture of the first object relative to a predetermined position based on a captured image including the hand and the first object, and
    wherein the control unit includes:
        a rotation center position calculation unit that detects a current position and a current posture of the first object, and calculates a rotation center position and a rotation center posture based on the current position and the current posture of the first object;
        a target derivation unit that detects a position and a posture of the second object based on the captured image acquired by an image acquisition unit and determines a target position and a target posture of the first object based on the captured image and the position and the posture of the second object;
        a movement operation amount calculation unit that determines a target operation amount of the first object, the target operation amount being an amount the first object is moved by the hand to match the target position and the target posture; and
        a robot control unit that calculates a target position and a target posture to which a force sensor is to move based on the target operation amount of the first object and moves the force sensor by way of the hand so that the position and the posture of the force sensor match the target position and the target posture of the force sensor.

2. The robot according to claim 1, wherein
    the predetermined position is a coordinate origin that moves with the first object, and
    the control unit is configured to translate and rotate the first object.

3. The robot according to claim 1, wherein the control unit is configured to perform visual servo control based on the captured image.

4. The robot according to claim 1, wherein the control unit is configured to perform compliant motion control according to a motion characteristic set in the predetermined position and each axial direction.

5. The robot according to claim 1, wherein the control unit is configured to derive a relative positional relationship between a position set in the hand and a position set in the first object based on the captured image, and update the predetermined position based on the derived positional relationship.

6. The robot according to claim 5, wherein the control unit is configured to update the predetermined position based on the derived positional relationship, and a relative positional relationship between the position set in the first object and the predetermined position.

7. The robot according to claim 1, further comprising:
    a marker indicating a position set in the hand,
    wherein the captured image further includes the marker, and
    the control unit is configured to derive a relative positional relationship between a position set in the hand and the predetermined position based on the position of the marker detected from the captured image, and update the predetermined position based on the derived relative positional relationship between the position set in the hand and the predetermined position.

8. The robot according to claim 7, wherein,
    if the control unit detects the marker and the position and the posture of the first object, the control unit is configured to update the predetermined position based on a first captured image including the imaged marker, a second captured image including the imaged first object, and a relative positional relationship between a first camera capturing the first captured image and a second camera capturing the second captured image.

9. The robot according to claim 1, wherein
    the control unit is configured to derive a relative positional relationship between the position set in the hand and the predetermined position based on the position in an initial state set in the hand, and update the predetermined position based on the derived relative positional relationship between the position set in the hand and the predetermined position.

10. A robot system comprising:
a robot including a hand; and
an imaging unit that images the hand and a first object,
wherein the robot is configured to move the first object toward a second object and is configured to operate the hand to control a position and a posture of the first object relative to a predetermined position based on a captured image including the hand and the first object captured by the imaging unit, and
wherein the robot includes:
- a rotation center position calculation unit that detects a current position and a current posture of the first object, and calculates a rotation center position and a rotation center posture based on the current position and the current posture of the first object;
- a target derivation unit that detects a position and a posture of the second object based on the captured image acquired by an image acquisition unit and determines a target position and a target posture of the first object based on the captured image and the position and the posture of the second object;
- a movement operation amount calculation unit that determines a target operation amount of the first object, the target operation amount being an amount the first object is moved by the hand to match the target position and the target posture; and
- a robot control unit that calculates a target position and a target posture to which a force sensor is to move based on the target operation amount of the first object and moves the force sensor by way of the hand so that the position and the posture of the force sensor match the target position and the target posture of the force sensor.

11. A control device for operating a robot including a hand,
wherein the control device is configured to cause the robot to move a first object toward a second object and is configured to operate the hand to control a position and a posture of the first object relative to a predetermined position based on a captured image including the hand and the first object, and
wherein the control device includes:
- a rotation center position calculation unit that detects a current position and a current posture of the first object, and calculates a rotation center position and a rotation center posture based on the current position and the current posture of the first object;
- a target derivation unit that detects a position and a posture of the second object based on the captured image acquired by an image acquisition unit and determines a target position and a target posture of the first object based on the captured image and the position and the posture of the second object;
- a movement operation amount calculation unit that determines a target operation amount of the first object, the target operation amount being an amount the first object is moved by the hand to match the target position and the target posture; and
- a robot control unit that calculates a target position and a target posture to which a force sensor is to move based on the target operation amount of the first object and moves the force sensor by way of the hand so that the position and the posture of the force sensor match the target position and the target posture of the force sensor.

12. A control method for operating a robot including a hand, comprising:
acquiring a captured image including the hand and a first object;
detecting a current position and a current posture of the first object, and calculating a rotation center position and a rotation center posture based on the current position and the current posture of the first object;
detecting a position and a posture of the second object based on the captured image acquired by an image acquisition unit and determining a target position and a target posture of the first object based on the captured image and the position and the posture of the second object;
determining a target operation amount of the first object, the target operation amount being an amount the first object is moved by the hand to match the target position and the target posture;
calculating a target position and a target posture to which a force sensor is to move based on the target operation amount of the first object and moving the force sensor by way of the hand so that the position and the posture of the force sensor match the target position and the target posture of the force sensor; and
moving the first object toward a second object and operating the hand to control a position and a posture of the first object relative to a predetermined position based on the captured image, the rotation center position and the rotation center posture.

* * * * *